US008019377B2

(12) United States Patent
Watanabe

(10) Patent No.: US 8,019,377 B2
(45) Date of Patent: Sep. 13, 2011

(54) INFORMATION NOTIFICATION APPARATUS AND PORTABLE COMMUNICATION TERMINAL

(75) Inventor: Kenichi Watanabe, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 298 days.

(21) Appl. No.: 12/304,736

(22) PCT Filed: May 10, 2007

(86) PCT No.: PCT/JP2007/059645
§ 371 (c)(1),
(2), (4) Date: Dec. 12, 2008

(87) PCT Pub. No.: WO2007/145041
PCT Pub. Date: Dec. 21, 2007

(65) Prior Publication Data
US 2009/0196576 A1 Aug. 6, 2009

(30) Foreign Application Priority Data

Jun. 15, 2006 (JP) .................................. 2006-166018

(51) Int. Cl.
*H04M 1/00* (2006.01)
(52) U.S. Cl. ................ 455/550.1; 455/566.1; 455/556.2
(58) Field of Classification Search ............... 455/550.1, 455/556.1, 556.2
See application file for complete search history.

(56) References Cited

U.S. PATENT DOCUMENTS

| 7,336,602 | B2 * | 2/2008 | Silvester ..................... 370/216 |
| 7,539,490 | B2 * | 5/2009 | Dickinson ................. 455/432.1 |
| 2003/0041137 | A1 | 2/2003 | Horie et al. |
| 2008/0026790 | A1 * | 1/2008 | Nakao et al. ............... 455/556.1 |
| 2009/0124296 | A1 * | 5/2009 | Tanae ............................. 455/567 |

FOREIGN PATENT DOCUMENTS

| JP | 11-177572 | | 7/1999 |
| JP | 2000-357146 | A | 12/2000 |
| JP | 2001-145140 | A | 5/2001 |
| JP | 2002-190845 | A | 7/2002 |
| JP | 2002-204475 | A | 7/2002 |
| JP | 2003-69599 | A | 3/2003 |
| JP | 2003-152679 | A | 5/2003 |
| JP | 2004-0328430 | | 11/2004 |
| JP | 2005-072764 | | 3/2005 |
| JP | 2005-236890 | A | 9/2005 |
| JP | 2006-60393 | A | 3/2006 |

* cited by examiner

*Primary Examiner* — Danh Le
(74) *Attorney, Agent, or Firm* — Birch, Stewart, Kolasch & Birch, LLP

(57) ABSTRACT

An information notification apparatus is provided that receives information defined in an electronic device as information about which a notification is to be given, and notifies an information communication terminal about the information. The information notification apparatus receives information from the electronic device. Receiving the information, the apparatus checks whether or not terminal i can communicate. When the terminal can communicate, the notification apparatus notifies terminal i about the information. If the terminal cannot communicate, the received information is written into a device information buffer. This process is performed for all terminals. Accordingly, the terminals are notified about the information by the information notification apparatus.

16 Claims, 20 Drawing Sheets

FIG.8

| TERMINAL | STATE |
|---|---|
| TERMINAL 1 | COMMUNICATION AVAILABLE |
| TERMINAL 2 | COMMUNICATION AVAILABLE |
| TERMINAL 3 | COMMUNICATION AVAILABLE |
| TERMINAL 4 | COMMUNICATION UNAVAILABLE |
| TERMINAL n | COMMUNICATION UNAVAILABLE |

FIG.9A

| | | | |
|---|---|---|---|
| | | | |
| | | | |
| 8 | RECORDING APPARATUS | 2006/01/17 21:30 | "RECORDING COMPLETED" |
| 7 | IP PHONE WITH ANSWERING MACHINE | 2006/01/17 21:20 | "MESSAGE RECORDED IN ABSENCE074200009999" |
| 6 | TV | 2006/01/17 21:00 | "TIMER ON" |
| 5 | IP PHONE WITH ANSWERING MACHINE | 2006/01/17 20:57 | "INCOMING CALL:0600000000" |
| 4 | RECORDING APPARATUS | 2006/01/17 20:55 | "RECORDING COMPLETED" |
| 3 | IP PHONE WITH ANSWERING MACHINE | 2006/01/17 15:40 | "MESSAGE RECORDED IN ABSENCE:0678901234" |
| 2 | IP PHONE WITH ANSWERING MACHINE | 2006/01/17 13:25 | "MESSAGE RECORDED IN ABSENCE:0743456789" |
| 1 | IP PHONE WITH ANSWERING MACHINE | 2006/01/17 10:12 | "INCOMING CALL:0345678901" |

FIG.9B

IP PHONE WITH ANSWERING MACHINE

| | | |
|---|---|---|
| | | |
| 6 | | |
| 5 | 2006/01/17 21:20 | "MESSAGE RECORDED IN ABSENCE : 074200009999" |
| 4 | 2006/01/17 20:57 | "INCOMING CALL:0600000000" |
| 3 | 2006/01/17 15:40 | "MESSAGE RECORDED IN ABSENCE : 0678901234" |
| 2 | 2006/01/17 13:25 | "MESSAGE RECORDED IN ABSENCE : 0743456789" |
| 1 | 2006/01/17 10:12 | "INCOMING CALL:0345678901" |

RECORDING APPARATUS

| | | |
|---|---|---|
| | | |
| 6 | | |
| 5 | | |
| 4 | | |
| 3 | | |
| 2 | 2006/01/17 21:30 | "RECORDING COMPLETED" |
| 1 | 2006/01/17 20:55 | "RECORDING COMPLETED" |

TV

| | | |
|---|---|---|
| | | |
| 5 | | |
| 4 | | |
| 3 | | |
| 2 | | |
| 1 | 2006/01/17 21:00 | "TIMER ON" |

FIG.11

| HOME ELECTRICAL DEVICE / TERMINAL TO BE NOTIFIED | | TERMINAL 1 | TERMINAL 2 | TERMINAL 3 | TERMINAL 4 | | TERMINAL n |
|---|---|---|---|---|---|---|---|
| DEVICE NUMBER | DEVICE TYPE | | | | | | |
| 01 | HD RECORDER | | 1 | | | | |
| 02 | PHONE WITH ANSWERING MACHINE | 1 | 1 | 1 | 1 | | |
| 03 | HOME ELECTRICAL DEVICE 3 | 1 | | | | | |
| n | HOME ELECTRICAL DEVICE m | 1 | | | | | |

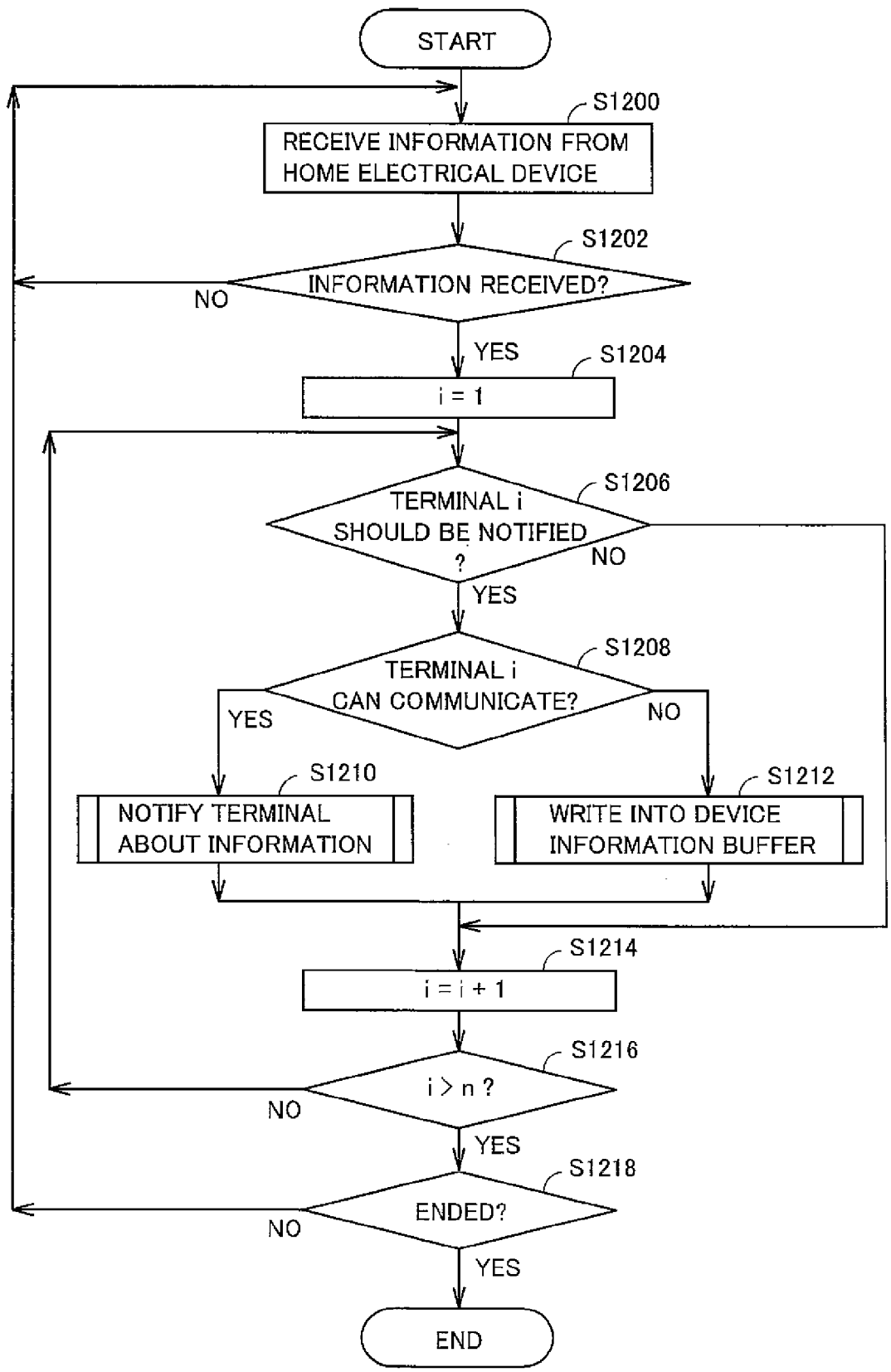

FIG.13A

| HOME ELECTRICAL DEVICE | | NUMBER OF NOTIFICATIONS | NOTIFICATION INTERVAL (MIN) |
|---|---|---|---|
| DEVICE NUMBER | DEVICE TYPE | | |
| 01 | HD RECORDER | 1 | |
| 02 | PHONE WITH ANSWERING MACHINE | 5 | 3 |
| 03 | HOME ELECTRICAL DEVICE 3 | 1 | |
| ... | ... | ... | ... |
| n | HOME ELECTRICAL DEVICE m | 1 | |

FIG.13B

| | | | | | |
|---|---|---|---|---|---|
| | | | | | |
| 5 | IP PHONE WITH ANSWERING MACHINE | 2006/01/17 21:20 | "MESSAGE RECORDED IN ABSENCE:074200009999" | 5 | 0 |
| 4 | TV | 2006/01/17 21:00 | "TIMER ON" | 1 | 0 |
| 3 | RECORDING APPARATUS | 2006/01/17 20:55 | "RECORDING COMPLETED" | 1 | 0 |
| 2 | IP PHONE WITH ANSWERING MACHINE | 2006/01/17 13:25 | "MESSAGE RECORDED IN ABSENCE:0743456789" | 2 | 89 |
| 1 | IP PHONE WITH ANSWERING MACHINE | 2006/01/17 10:12 | "INCOMING CALL: 0345678901" | 3 | 80 |

| HOME ELECTRICAL DEVICE | | ADDITION/ REPLACEMENT |
|---|---|---|
| DEVICE NUMBER | DEVICE TYPE | |
| 01 | HD RECORDER | 1 |
| 02 | PHONE WITH ANSWERING MACHINE | 2 |
| 03 | HOME ELECTRICAL DEVICE 3 | 1 |
| n | HOME ELECTRICAL DEVICE m | 1 |

FIG.18

| INFORMATION NOTIFICATION ADDITION/REPLACEMENT ||
|---|---|
| DEVICE NAME | SETTING |
| HD RECORDER | ●ADDITION ○REPLACEMENT |
| PHONE WITH ANSWERING MACHINE | ○ADDITION ●REPLACEMENT |
| HOME ELECTRICAL DEVICE 3 | ●ADDITION ○REPLACEMENT |
| HOME ELECTRICAL DEVICE 4 | ●ADDITION ○REPLACEMENT |

SETTING

INFORMATION NOTIFICATION APPARATUS AND PORTABLE COMMUNICATION TERMINAL

TECHNICAL FIELD

The present invention relates to an apparatus capable of communicating with an electronic device and a portable communication terminal. In particular, the invention relates to an apparatus notifying a portable communication terminal about information the apparatus received from a stationary electronic device.

BACKGROUND ART

In recent years, with the increased broadband penetration as well as digital broadcasting for example, home networking has been expanding to involve not only a PC (Personal Computer) but also home electrical devices.

Japanese Patent Laying-Open No. 2001-145140 (Patent Document 1) discloses a program recording system. The program recording system enables a user to know programs and make a program recording reservation even away from home by means of a wireless telephone. For example, a user can know what programs are to be broadcasted, through program guide information provided from a recording reservation site to a portable terminal. Further, in response to a user's designation of a program, information about a reservation for the program is transmitted from the recording reservation site to the portable terminal. Based on the information about the reservation, the user can make a recording reservation at a recording apparatus such as video tape recorder.

Japanese Patent Laying-Open No. 2005-236890 (Patent Document 2) discloses a portable terminal having the capability of recording a video audio signal. The portable terminal can inform a user of the conditions of the terminal itself before recording a video audio signal based on information about a reservation. For example, the terminal calculates the conditions of the terminal itself such as the free space of the recording area and the remaining capacity of the battery. If the space/capacity is insufficient, the user is notified of the shortage in space/capacity. Accordingly, the user can take necessary measures in advance.

Japanese Patent Laying-Open No. 2002-204475 (Patent Document 3) discloses a telephone subscriber management apparatus. With the subscriber management apparatus, a user of a portable terminal can know that there is an incoming call even when the incoming call arrives in the state where the portable terminal cannot make communication. For example, in the case where a receiver terminal cannot receive an incoming call because the terminal is out of the service area for example, the subscriber management apparatus stores the incoming call. When the subscriber management apparatus finds that the receiver terminal becomes able to make a call, the apparatus notifies the receiver terminal of the stored incoming call.

Patent Document 1: Japanese Patent Laying-Open No. 2001-145140
Patent Document 2: Japanese Patent Laying-Open No. 2005-236890
Patent Document 3: Japanese Patent Laying-Open No. 2002-204475

DISCLOSURE OF THE INVENTION

Problems to be Solved by the Invention

As described above, with the technique disclosed in Japanese Patent Laying-Open No. 2001-145140, a user can make a recording reservation at a recording apparatus by means of a portable terminal. Further, with the technique disclosed in Japanese Patent Laying-Open No. 2005-236890, a user is notified, when a recording reservation cannot be made, of the fact that the recording reservation cannot be made. In the case of these techniques, however, the user is not notified of the fact that a recording has been made successfully. As a result, the user who made a recording reservation may forget to watch the recorded program.

Further, with the technique disclosed in Japanese Patent Laying-Open No. 2002-204475, the subscriber management apparatus notifies a receiver terminal of an incoming call that arrived when the receiver terminal was ineffective. In the case, however, where a subscriber telephone such as fixed-line telephone cannot answer an incoming call due to absence of the user, a notification about the incoming call cannot be given from the subscriber management apparatus. This is for the reason that this incoming call to the subscriber telephone is a normal call and thus the subscriber management apparatus does not store the incoming call.

The present invention has been made to solve the problems as described above, and an object of the invention is to provide an information notification apparatus noticing a portable communication terminal about information defined in advance in an electronic device as information about which a notification is to be given.

Means for Solving the Problems

In order to accomplish the object above, an information notification apparatus according to an aspect of the present invention includes: a communication unit for communicating with a stationary electronic device and communicating by radio with a portable communication terminal; a storage unit for storing notification information from the electronic device, the notification information being defined in advance as information of which the portable communication terminal is to be notified; and a control unit for controlling the communication unit and the storage unit. The control unit includes: a determination unit for determining that the portable communication terminal is in a state where the portable communication terminal can communicate by radio; a writing unit for receiving the notification information from the electronic device, and writing into the storage unit the received notification information, in response to a determination by the determination unit that the portable communication terminal is not in the state where the portable communication terminal can communicate by radio; and a communication control unit for controlling the communication unit such that the portable communication terminal is notified of the notification information from the electronic device, in response to a determination by the determination unit that the portable communication terminal is in the state where the portable communication terminal can communicate by radio.

Preferably, the storage unit stores a first association between the electronic device and identification information of a portable communication terminal to be notified of the notification information from the electronic device. The communication control unit controls the communication unit such that the portable communication terminal associated by the first association is notified of the notification information from the electronic device.

When the communication unit does not receive a response to the notification information from the portable communication terminal, the communication control unit controls the communication unit such that the notification information is repeatedly transmitted to the portable communication terminal having failed to make the response.

Preferably, in a case where the storage unit holds notification information from the electronic device and when the communication unit receives notification information from the electronic device, the writing unit writes the received notification information in addition to the held notification information.

Preferably, in a case where the storage unit holds notification information from the electronic device and when the communication unit receives notification information from the electronic device, the writing unit writes the received notification information in replacement of a part of the held notification information.

Preferably, the storage unit stores a second association between the electronic device and writing of notification information from the electronic device into the storage unit by addition or writing of notification information from the electronic device into the storage unit by replacement. The writing unit writes the notification information from the electronic device into the storage unit based on the second association.

According to another aspect of the present invention, a portable communication terminal for receiving notification information transmitted from an information notification apparatus is provided. The portable communication terminal includes: a communication unit for communicating with the information notification apparatus by radio; and a control unit for controlling the communication unit. The control unit includes: a determination unit for determining that the information notification apparatus is in a state where the information notification apparatus can communicate by radio; and a communication control unit for controlling the communication unit such that a signal is transmitted to the information notification apparatus for requesting notification information held by the information notification apparatus, in response to a determination by the determination unit that the information notification apparatus is in the state where the information notification apparatus can communicate by radio.

Effects of the Invention

In accordance with the present invention, the information notification apparatus can transmit, to the portable communication terminal, notification information that is defined in advance and provided from an electronic device. Thus, the user of the portable communication terminal can know the notification information. Accordingly, the user can know from the notification information what state the electronic device is in. Further, the user's attention to the electronic device is called.

BRIEF DESCRIPTION OF THE DRAWINGS

FIG. 8 is a diagram showing an example of a communication available/unavailable determination table.

FIG. 9A is a diagram showing a configuration of a device information buffer 240.

FIG. 9B is a diagram showing a configuration of device information buffer 240.

FIG. 11 is a diagram showing an association table for a home electrical device and a terminal.

FIG. 12 is a flowchart showing a flow of a process of giving a notification about information according to an association table.

FIG. 13A is a diagram showing an example of a management table for re-notification.

FIG. 13B is a diagram showing an example of a management table for re-notification.

FIG. 17 is a diagram showing an example of an information addition/replacement setting table.

FIG. 18 is a diagram showing an example of a setting operation screen for an information addition/replacement process.

DESCRIPTION OF THE REFERENCE SIGNS

Figure 1:
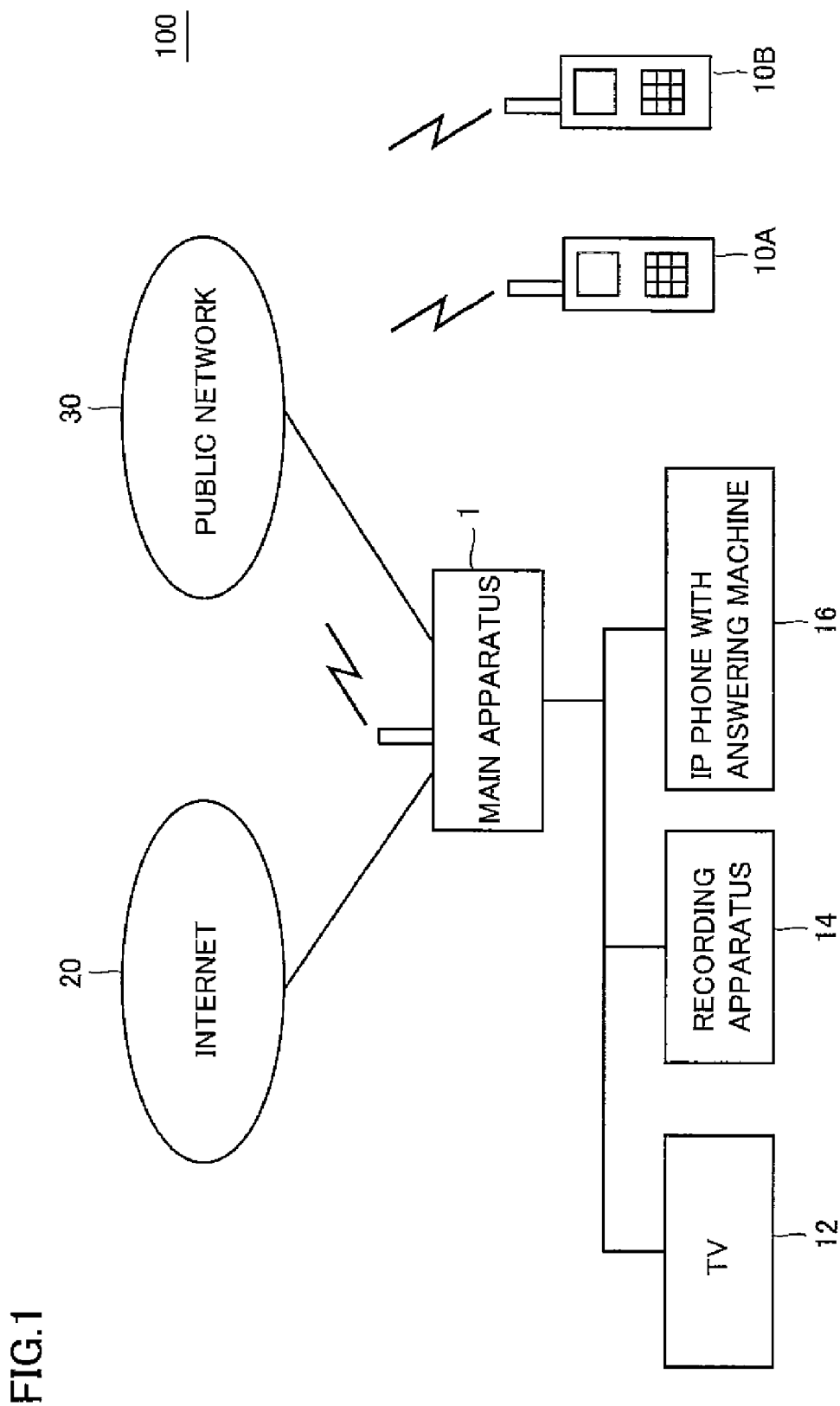
FIG. 1 is a schematic diagram showing a configuration of a home network system 100 in a first embodiment.

1 main apparatus, 10A, 10B terminal, 12 television, 14 recording apparatus, 16 IP telephone with answering machine, 130, 132 column, 200 system control unit, 210 public network line control unit, 220 WAN-side communication control unit, 230, 370, 480, 580, 660 LAN-side communication control unit, 232, 380, 490, 590 wired LAN interface, 234, 670 wireless control unit, 236, 680 wireless LAN interface, 240 device information buffer, 250, 340, 440, 540 setting information storage unit, 260 U/I control unit, 270 audio processing unit, 300, 400, 500, 600 control unit, 310, 404 tuner, 312, 402 antenna, 314, 406 decoding and demodulation unit, 320 video display processing unit, 322, 432, 650 display unit, 330, 430, 530, 640 key operation unit, 350, 450 reservation information storage unit, 360, 460 timer, 410, 510 analog/digital conversion unit, 420 digital/analog conversion unit, 422 video signal output unit, 470 recording data storage unit, 512 handset, 532 information display unit, 534 speaker, 570 answering-machine-recorded-data storage unit, 620 audio input unit, 630 audio output unit

BEST MODES FOR CARRYING OUT THE INVENTION

In the following, embodiments of the present invention will be descried with reference to the drawings. In the following description, like components are denoted by like reference characters. The components are named identically and function identically. Therefore, a detailed description thereof will not be repeated.

First Embodiment

In the present embodiment, a home network system including a main apparatus and a portable terminal capable of communicating with the main apparatus by radio, and including a home electrical device will be considered. The main apparatus can notify, by radio, the portable terminal about device information that the main apparatus received from the home electrical device. At this time, in the case where the main apparatus determines that the terminal is out of the communication-available area, the main apparatus writes the information of the home electrical device into a device information buffer. When the main apparatus determines that the terminal enters the communication-available area, the main apparatus notifies the terminal about the information written into the device information buffer. Thus, the user of the portable terminal can surely know the state of the home electrical device from the device information. The home electrical device may be a stationary electronic device. In addition, this network system can be implemented not only in the home but also in an office.

FIG. 1 is a schematic diagram showing a configuration of a home network system 100 in the first embodiment.

Referring to FIG. 1, home network system 100 in the first embodiment will be described. This system is configured to include, as main components, a main apparatus 1, home electrical devices such as a television 12, a recording apparatus 14 and an IP (Internet Protocol) telephone with answering machine 16 for example, a terminal 10A, and a terminal 10B.

Main apparatus 1 is capable of performing radio communication with terminal 10A and terminal 10B. Main apparatus 1 is connected to the Internet 20 and a public network 30. Accordingly, main apparatus 1 can communicate with any device outside the home. Main apparatus 1, however, may not necessarily be connected to an external network.

Figure 2:
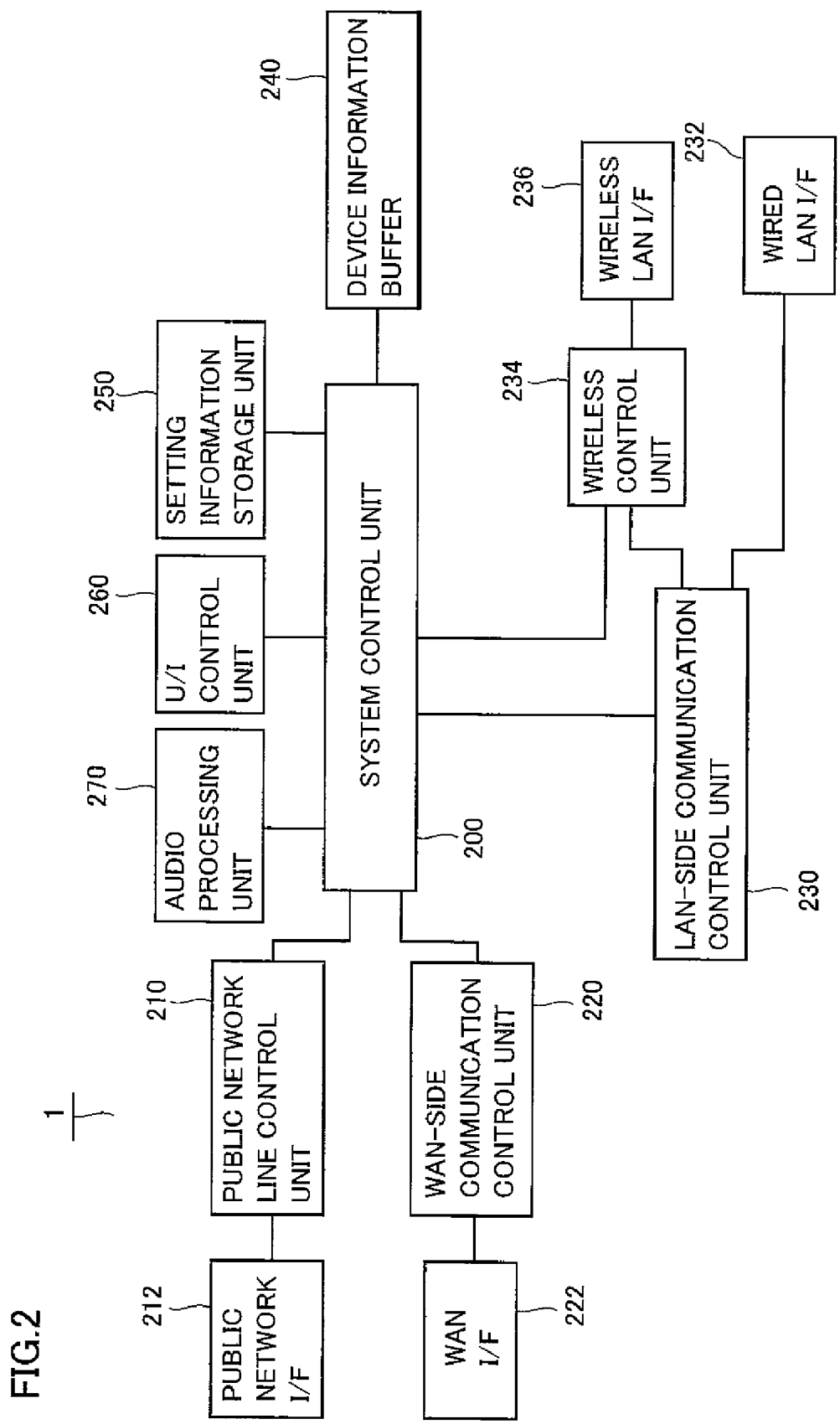
FIG. 2 is a functional block diagram of a main apparatus 1.

FIG. 2 is a functional block diagram of main apparatus 1. Referring to FIG. 2, a configuration of main apparatus 1 will be described. Main apparatus 1 includes, as main components, a system control unit 200 for controlling the whole system, and a public network line control unit 210, a WAN (Wide Area Network)-side communication control unit 220, a LAN-side communication control unit 230, a wireless control unit 234, a device information buffer 240, a setting information storage unit 250, a U/I (User Interface) control unit 260, and an audio processing unit 270 that are controlled by system control unit 200.

System control unit 200 performs predetermined processing based on data stored in advance in a storage unit (not shown) as contained.

Public network line control unit 210 has a public network interface 212 such as modular jack used for connection to the public network. Accordingly, a telephone (not shown) included in home network system 100 can be used for connection to public network 30.

WAN-side communication control unit 220 has a WAN interface 222 used for connection to an external network such as the Internet. Accordingly, a PC (not shown) for example within the LAN can be used for connection to the Internet 20.

LAN-side communication control unit 230 controls communication performed via a wired LAN interface 232 or a wireless LAN interface 236 between a device (not shown) provided on the LAN side and main apparatus 1. The wireless LAN is controlled by wireless control unit 234. While the wireless LAN is illustrated here as an example of wireless communication, short-range wireless communication such as Bluetooth (registered) or HomeRF (Home Radio Frequency) may be used instead.

In FIG. 1, home electrical devices such as television 12, recording apparatus 14 and IP telephone with answering machine 16 as well as terminals 10A, 10B are provided on the LAN side. In addition, a television doorphone adapter, an audio terminal, a video terminal and the like may be provided on the LAN side to communicate with main apparatus 1.

Referring back to FIG. 2, device information buffer 240 serves as a buffer for holding information from a home electrical device in the case where the information cannot be transmitted to each terminal.

Setting information storage unit 250 stores various setting information for home network system 100, such as information used for communication with a terminal, for example.

U/I control unit 260 controls an interface used for making various settings for home network system 100. In general, the control unit corresponds to an HTTP server. This HTTP server is not mounted with a key and a display unit. A user makes various settings by means of a browser of a PC (not shown) provided on the LAN side.

Audio processing unit 270 performs audio processing on the information of the home electrical device and notifies the user about the information by audio.

Figure 3:
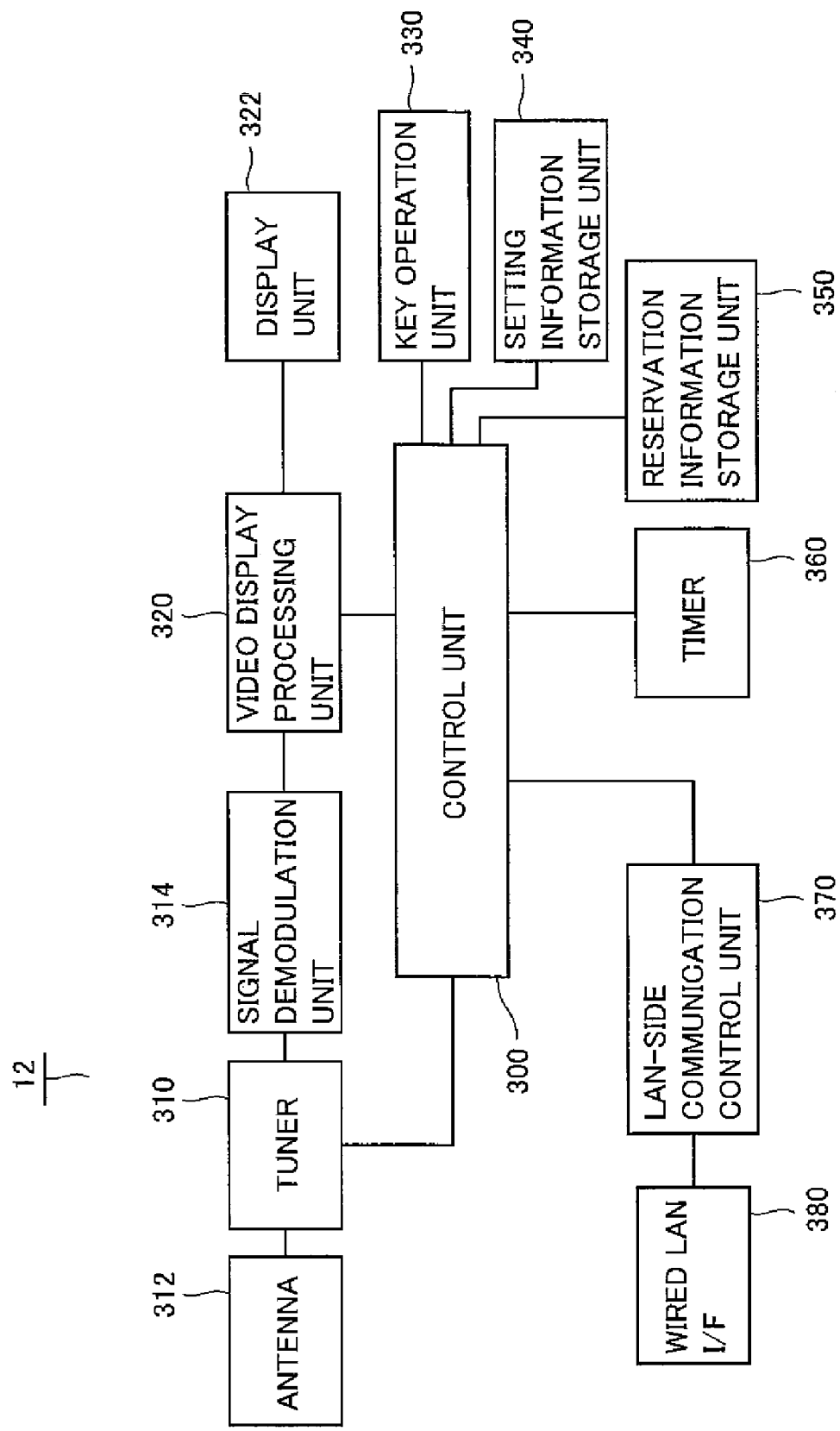
FIG. 3 is a functional block diagram of a television 12.

FIG. 3 is a functional block diagram of television 12. Referring to FIG. 3, a configuration of television 12 will be described. Television 12 includes, as main components, a control unit 300 controlling the whole television 12, and a tuner 310, a video display processing unit 320, a key operation unit 330, a setting information storage unit 340, a reservation information storage unit 350, a timer 360, a LAN-side communication control unit 370, and a wired LAN interface 380 that are controlled by control unit 300.

LAN-side communication control unit 370 performs functions similar to the functions performed by LAN-side communication control unit 230. Wired LAN interface 380 performs functions similar to the functions performed by wired LAN interface 232.

Control unit 300 performs predetermined processing based on data stored in advance in a storage unit (not shown) as contained.

Tuner 310 provides, to a signal demodulation unit 314, airwaves of a television broadcast selected by a user from airwaves of television broadcasts received from an antenna 312. Signal demodulation unit 314 demodulates a video signal from the airwaves of the television broadcast.

Video display processing unit 320 performs signal-conversion processing on the demodulated video signal. Display unit 322 displays an image received from video display processing unit 320.

A user makes various settings such as channel setting, volume setting, setting for timer reservation and other settings by means of key operation unit 330.

Setting information storage unit 340 stores various settings such as channel setting, volume setting and other settings. Further, in setting information storage unit 340, the type of information to be transmitted to main apparatus 1 is defined in advance.

Reservation information storage unit 350 stores information about a reservation made by a user. Timer 360 is used for making a reservation.

Television 12 communicates with main apparatus 1 via wired LAN interface 380 under control by LAN-side communication control unit 370. Television 12 transmits to main apparatus 1 information about which a terminal is to be notified, as defined in setting information storage unit 340.

Figure 4:
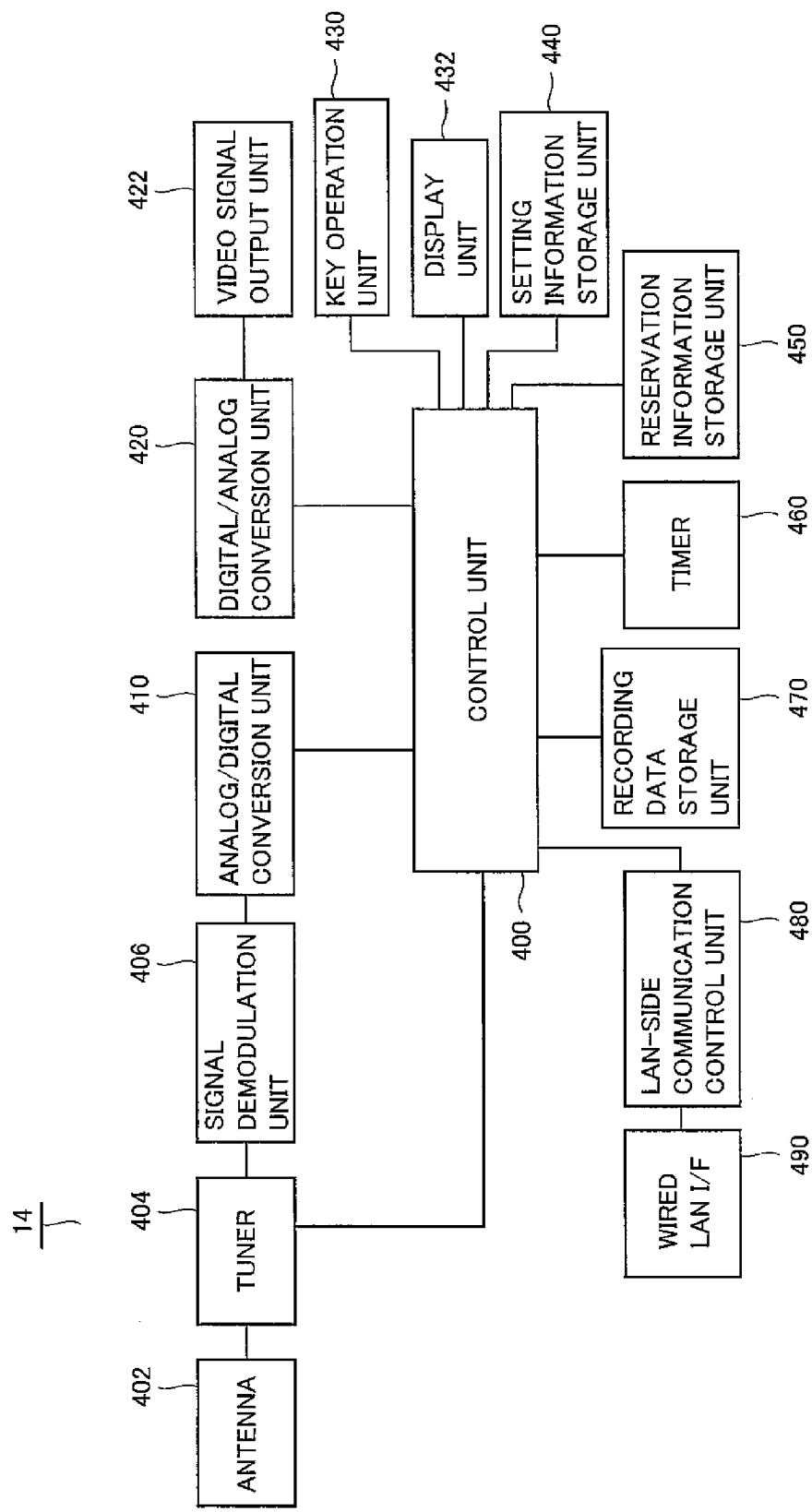
FIG. 4 is a functional block diagram of a recording apparatus 14.

FIG. 4 is a functional block diagram of recording apparatus 14. Referring to FIG. 4, a configuration of recording apparatus 14 will be described. Recording apparatus 14 includes, as main components, a control unit 400 controlling the whole recording apparatus 14, and a tuner 404, an analog/digital conversion unit 410, a digital/analog conversion unit 420, a key operation unit 430, a display unit 432, a setting information storage unit 440, a reservation information storage unit 450, a timer 460, a recording data storage unit 470, a LAN-side communication control unit 480, and a wired LAN interface 490 that are controlled by control unit 400.

A signal demodulation unit 406 performs functions similar to the functions performed by signal demodulation unit 314. LAN-side communication control unit 480 performs functions similar to the functions performed by LAN-side communication control unit 230. Wired LAN interface 490 performs functions similar to the functions performed by wired LAN interface 232.

Control unit 400 performs predetermined processing based on data stored in advance in a storage unit (not shown) as contained.

In the case where a television broadcast received by tuner 404 via an antenna 402 is an analog broadcast, analog/digital conversion unit 410 digitizes the video signal provided from signal demodulation unit 406. In the case where a television broadcast as received is a digital broadcast, analog/digital conversion unit 410 is unnecessary.

Digital/analog conversion unit 420 converts video data provided from control unit 400 into analog data. Video signal output unit 422 outputs a reproduction image to a video output device such as television. Even when an analog television is connected to video signal output unit 422, digital/analog conversion unit 420 can be used to enable the analog television to display the digitized video data. In the case where a television adapted to digital input is connected, digital/analog conversion unit 420 is unnecessary.

Using key operation unit 430, a user operates the apparatus for recording, reproduction and recording reservation for example. Display unit 432 displays operation screens such as screens for recording, reproduction and recording reservation, as well as various setting screens.

Setting information storage unit 440 stores various setting information. In setting information storage unit 440, the type of information to be transmitted to main apparatus 1 is defined in advance.

Reservation information storage unit 450 stores information about recording reserved by a user. Timer 460 is a clock for making a recording as reserved.

Recording data storage unit 470 stores data recorded by recording apparatus 14. Recording apparatus 14 transmits, to main apparatus 1, information about which a terminal is to be notified, via wired LAN interface 490 under control by LAN-side communication control unit 480.

Figure 5:
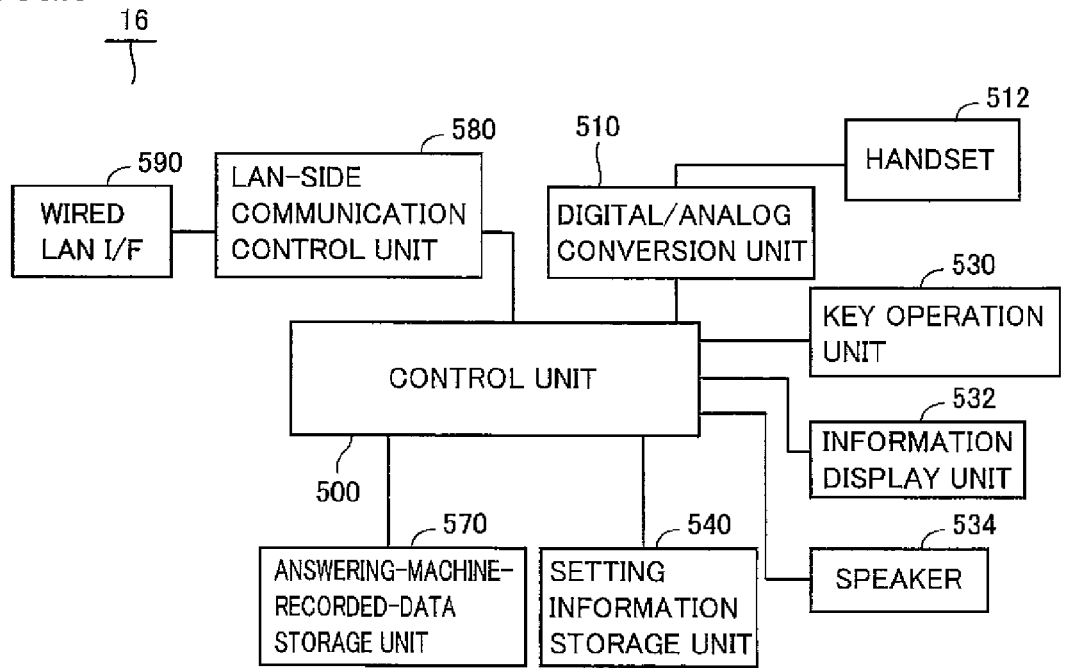
FIG. 5 is a functional block diagram of an IP telephone with answering machine 16.

FIG. 5 is a functional block diagram of IP telephone with answering machine 16. Referring to FIG. 5, a configuration of IP telephone with answering machine 16 will be described. IP telephone with answering machine 16 includes, as main components, a control unit 500 controlling the whole IP telephone with answering machine 16, and a digital/analog conversion unit 510, a key operation unit 530, an information display unit 532, a speaker 534, a setting information storage unit 540, an answering-machine-recorded-data storage unit 570, a LAN-side communication control unit 580, and a wired LAN interface 590 that are controlled by control unit 500. LAN-side communication control unit 580 performs functions similar to the functions performed by LAN-side communication control unit 230. Wired LAN interface 590 performs functions similar to the functions performed by wired LAN interface 232.

Control unit 500 performs predetermined processing based on data stored in advance in a storage unit (not shown) as contained.

Digital/analog conversion unit 510 digitizes an analog voice to be transmitted that is received from a handset 512 which is used by a user for making a telephone conversation. Further, digital/analog conversion unit 510 converts a digital voice that is received from an IP network into an analog voice and sends the voice to the handset.

Using key operation unit 530, a user operates a dial and makes various settings.

Information display unit 532 displays a telephone number entered by a user, a caller 10 as the call arrives, as well as setting screens and setting details for various settings.

Speaker 534 outputs a telephone ring as the call arrives, a reproduced sound of answering-machine-recorded data, a key operation sound, and audio assist for example.

Setting information storage unit 540 stores various setting information. In setting information storage unit 540, the type of information to be transmitted to main apparatus 1 is defined in advance.

Answering-machine-recorded-data storage unit 570 stores a message from a caller as the answering machine is set active and incoming call history for example.

IP telephone with answering machine 16 transmits, to main apparatus 1, information of which a terminal is to be notified, via wired LAN interface 590 under the control by LAN-side communication control unit 580.

Figure 6:
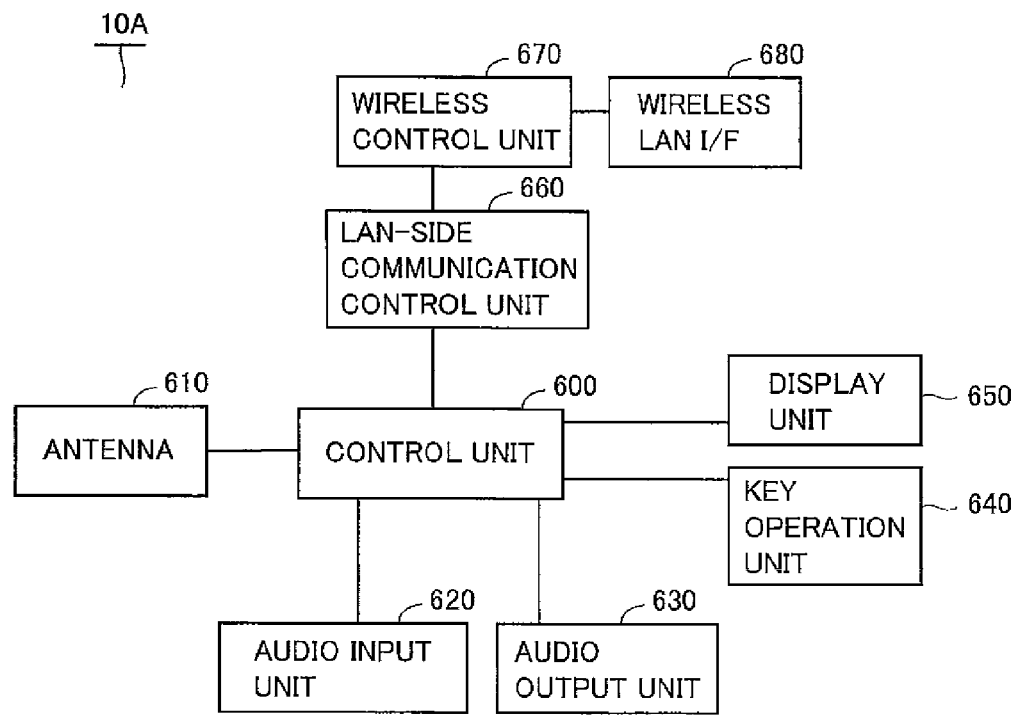
FIG. 6 is a functional block diagram of a terminal 10A.

FIG. 6 is a functional block diagram of terminal 10A. Referring to FIG. 6, a configuration of terminal 10A will be described. Here, terminal 10B is configured identically to terminal 10. Terminal 10A includes, as main components, a control unit 600 controlling the whole terminal 10A, and an audio input unit 620, an audio output unit 630, a key operation unit 640, a display unit 650, a LAN-side communication control unit 660, a wireless control unit 670, and a wireless LAN interface 680 that are controlled by control unit 600.

LAN-side communication control unit 660 performs functions similar to the functions performed by LAN-side communication control unit 230. Wireless control unit 670 performs functions similar to the functions performed by wireless control unit 234. Wireless LAN interface 680 performs functions similar to the functions performed by wireless LAN interface 236.

Terminal 10A receives a signal from a telephone network via an antenna 610. The received signal is provided to control unit 600. Control unit 600 decodes audio data included in the received signal and provides the data to audio output unit 630. Here, the sound that is input via audio input unit 620 is coded by control unit 600. The coded signal undergoes processing such as compression and the processed signal is transmitted from antenna 610.

Further, terminal 10A communicates with main apparatus 1 via wireless LAN interface 680. For a signal received by wireless control unit 670 from main apparatus 1, control unit 600 identifies the type of the signal and performs appropriate decoding to convert the signal into audio data or character data. The audio data is provided to audio output unit 630. The character data is provided to display unit 650.

Terminal 10A outputs a signal indicating the presence of the terminal via wireless LAN interface 680. Wireless control unit 234 of main apparatus 1 receives this signal to determine whether communication with the terminal can be made.

Key operation unit 640 is an interface used by a user to operate the dial or to make other settings for the terminal.

Main apparatus 1 stores the MAC (Media Access Control) address of a terminal that can make radio communication, in setting information storage unit 250. In the present embodiment, terminal 10A and terminal 10B are numbered and manipulated as terminal 1 and terminal 2 for the sake of convenience in main apparatus 1.

In the following, a description will be given of a process in home network system 100 including devices configured as described above, Following the process as described below, main apparatus 1 can transmit, to a terminal, information about a home electrical device included in home network system 100. In this case, when main apparatus 1 determines that the terminal is out of the communication-available area, main apparatus 1 writes the information about the home electrical device into device information buffer 240. When main apparatus 1 determines that the terminal enters the communication-available area, main apparatus 1 notifies the terminal about the information written into device information buffer 240.

Figure 7:
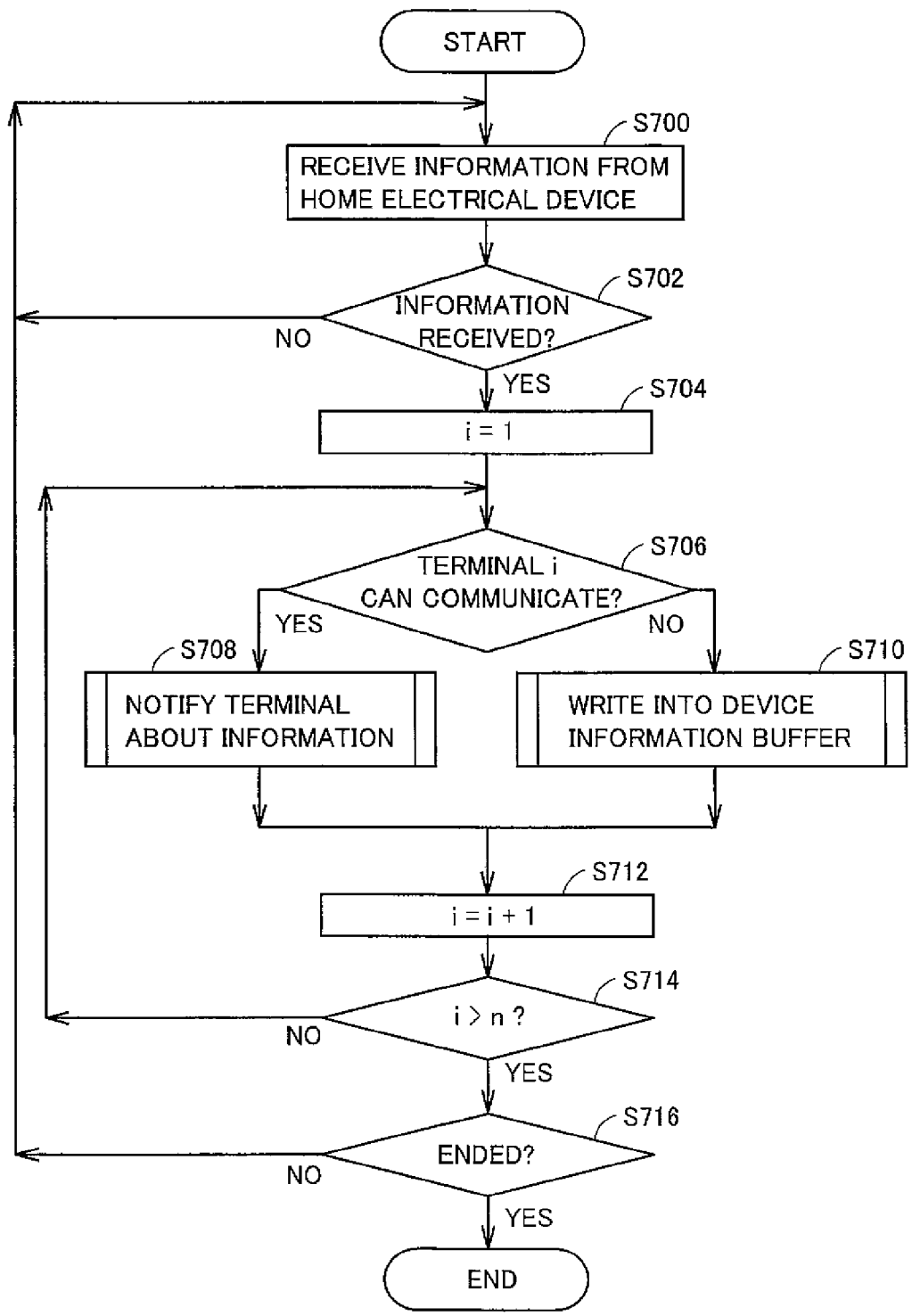
FIG. 7 is a flowchart showing a flow of a process of transmitting, to a terminal, information received from a home electrical device or writing the information into a device information buffer in the first embodiment.

FIG. 7 is a flowchart showing a flow of a process of transmitting information received from a home electrical device to a terminal, or a flow of a process of writing the information into the device information buffer.

Referring to FIG. 7, a description will be given of a process performed by main apparatus 1 in the case where main apparatus 1 receives information from a home electrical device and transmits the received information about the home electrical device to a terminal.

In step S700, system control unit 200 receives, via LAN-side communication control unit 230, information from television 12, recording apparatus 14 and IP telephone with answering machine 16. Here, in each home electrical device, information indicating a change of the state of the home electrical device is defined in advance as information about which the terminal is to be notified. For example, as for television 12, in response to the start of a timer which has been set to a time by a user, information "timer ON" is transmitted to main apparatus 1. As for recording apparatus 14, in response to the completion of a program recording reserved by a user, information "recording completed" is transmitted to main apparatus 1. As for IP telephone with answering machine 16, in response to an incoming call or recording of a message when an incoming call is missed, such information as "incoming call: 0312345678 (number of the caller)" or the number of incoming calls is transmitted to main apparatus 1. The information about which the terminal is to be notified may be defined at the time the home electrical device is manufactured, or defined by a user who purchased the home electrical device. Main apparatus 1 associates the type of the home electrical device with the information about which the terminal is to be notified and performs a notifying operation for example. In this case, main apparatus 1 may manage home electrical devices by attaching device numbers to respective devices.

In step S702, system control unit 200 determines whether or not there is information received. When main apparatus 1 has not received information from a home electrical device (NO in step S702), system control unit 200 returns the process to step S700. When main apparatus 1 has received information (YES in step S702), system control unit 200 sets number i indicating a terminal number to 1 (step S704).

In step S706, system control unit 200 determines whether or not main apparatus 1 and terminal i can communicate with each other. For this determination, a communication available/unavailable determination table is used.

FIG. 8 is a diagram showing an example of the communication available/unavailable determination table. Referring to FIG. 8, the communication available/unavailable table will be described. The communication available/unavailable determination table is held by setting information storage unit 250. In the communication available/unavailable table, the state of communication with main apparatus 1 is indicated for each terminal. In FIG. 8, for example, it is indicated that terminal 1 can communicate with main apparatus 1 (namely the terminal is within the communication available range of main apparatus 1). Further, it is indicated that terminal 4 cannot communicate with main apparatus 1 (namely the terminal is out of the communication available range of main apparatus 1). How the communication available/unavailable table is produced will be described hereinlater.

Referring again to FIG. 7, when system control unit 200 determines that main apparatus 1 can communicate with terminal i (YES in step S706), system control unit 200 performs a process of notifying the terminal about information (step S708). Here, system control unit 200 instructs wireless control unit 234 to transmit the information received in step S700 to terminal i via wireless LAN interface 236.

When system control unit 200 determines that main apparatus 1 cannot communicate with terminal i (NO in step S706), system control unit 200 writes the information into device information buffer 240 (step S710).

FIGS. 9A and 9B are each a diagram showing a configuration of device information buffer 240. FIG. 9A is a diagram showing an example where information items for respective devices are included in the same buffer, and FIG. 9B is a diagram showing an example where different buffers are provided for respective devices.

Referring to FIGS. 9A and 9B, device information buffer 240 will be described. Device information buffer 240 includes an information message table. As for the information message table, information items for respective devices may be included in the same buffer as shown in FIG. 9A, or different buffers may be provided for respective devices as shown in FIG. 9B.

The information message table holds the type of the home electrical device, the date when information is transmitted from the home electrical device and details of the notification for example, in association with a counter number. In FIG. 9A, the message indicated by counter 1 is a message from the IP telephone with answering machine, showing that there is an incoming call from 0345678901 at twelve past ten a.m. on Jan. 17, 2006. In FIG. 9B, in the information message table for the recording apparatus, the message indicated by counter 2 shows that recording is completed at nine-thirty p.m. on Jan. 17, 2006.

Device information buffer 240 includes information message tables for respective terminals, and system control unit 200 writes information about which the terminal cannot be notified into a corresponding table. How the terminal is notified about the written information will be described hereinlater.

Referring back to FIG. 7, as the process for terminal i is completed in the above-described manner, system control unit 200 increments number i by one (step S712). Then, system control unit 200 determines which of number i and number n (n=2 in the present embodiment) of terminals registered in setting information storage unit 250 of main apparatus 1 is larger/smaller. When system control unit 200 determines that number i is equal to or smaller than number n of terminals registered in main apparatus 1 (NO in step S714), system control unit 200 returns the process to step S706.

When system control unit 200 determines that number i is larger than number n of terminals registered in main apparatus 1 (YES in step S714), system control unit 200 determines whether or not an ending condition is satisfied (step S716). Here, as long as no instruction to end is given from the user, the process may be continued. Alternatively, the process may be ended when the number of times the above-described process is performed reaches the number defined in advance, or the process may be ended when a certain time has passed since the start of the process.

When system control unit 200 determines that the ending condition is not satisfied (NO in step S716), system control unit 200 returns the process to step S700. When system control unit 200 determines that the ending condition is satisfied (YES in step S716), the process is ended.

Following the above-described process, main apparatus 1 can receive information from a home electrical device and send to a terminal the received information about the home electrical device.

In the following, a description will be given of a method for producing a communication available/unavailable determination table, and a method for making a notification about information written in an information message table.

Figure 10:
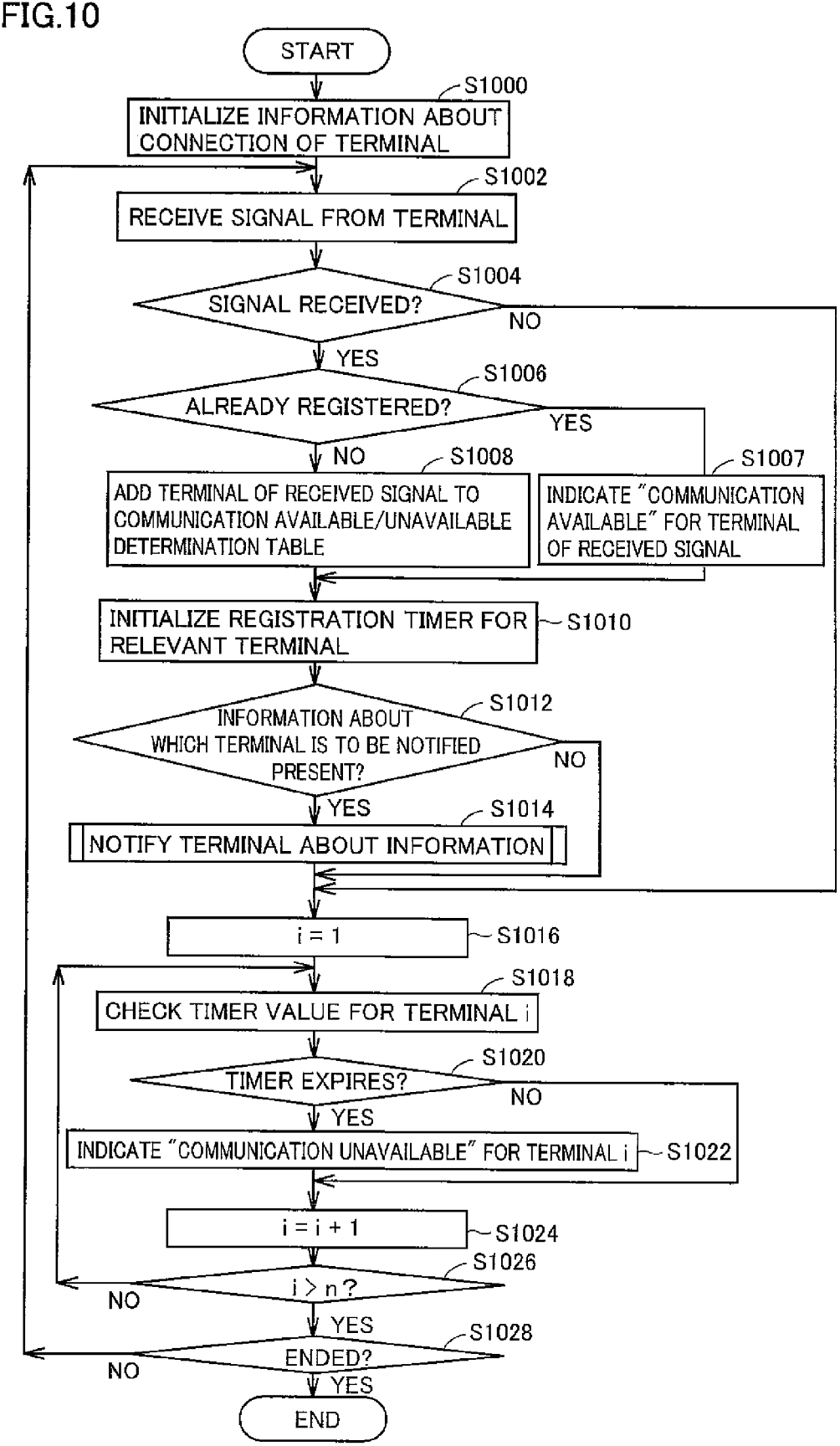
FIG. 10 is a flowchart showing a flow of a process followed by main apparatus 1 for examining the communication state of a terminal and giving a notification about information.

FIG. 10 is a flowchart showing a flow of a process followed by main apparatus 1 for examining the state of communication of a terminal and giving a notification about information.

Referring to FIG. 10, a process performed by main apparatus 1 will be described. Main apparatus 1 produces a communication available/unavailable table, and notifies a terminal for which a message is held in an information message table, about information. System control unit 200 performs the process shown in FIG. 7 and the process shown in FIG. 10 in parallel.

System control unit 200 makes a determination about whether or not communication can be made with a terminal (FIG. 7, step S706), based on a communication available/unavailable table produced in the process in FIG. 10. In the case where system control unit 200 determines that communication with the terminal cannot be made and writes information into device information buffer 240 (FIG. 7, step S710), notification about the information is given in the process shown in FIG. 10.

First, in step S1000, system control unit 200 initializes the information about connection of terminals as stored in setting information storage unit 250. For example, in the communication available/unavailable table shown in FIG. 8, "state" cells showing the state of communication are all set to indicate "communication unavailable."

In step S1002, system control unit 200 receives via wireless control unit 234 a signal from a terminal. The terminal frequently outputs a signal indicating the presence of the terminal itself. Wireless control unit 234 receives via wireless LAN interface 236 the signal from the terminal.

When system control unit 200 determines that a signal from a terminal is received in step S1002 (YES in step S1004), system control unit 200 determines whether or not this terminal is registered as a terminal to be notified of information, based on the communication available/unavailable table held in setting information storage unit 250 (step S1006). When system control unit 200 determines that a signal from a terminal is not received (NO in step S1004), system control unit 200 proceeds to step S1016.

Then, when system control unit 200 determines that the terminal which has transmitted the information received in step S1002 is not registered as a terminal to be notified of information in the communication available/unavailable table (NO in step S1006), system control unit 200 adds the terminal to the communication available/unavailable table and indicates the state of communication as "communication available" (step S1008). At this time, information about the terminal such as the MAC address of the terminal is written in setting information storage unit 250. On the contrary, when system control unit 200 determines that the terminal which has transmitted the information as received is registered as a terminal to be notified of information (YES in step S1006), system control unit 200 indicates the state of communication of the terminal as "communication available" (step S1007).

In step S1010, system control unit 200 initializes a registration timer for the terminal which has transmitted the signal received in step S1002. System control unit 200 includes a timer therein (not shown in FIG. 2). Based on this timer, the registration timer is automatically decremented. For example, when the registration timer for terminal I is initialized in step S1010, the registration timer is set to 100 (preset value). Then, registration timer is decremented like 100, 99, 98 . . . according to the timer.

In step S1012, system control unit 200 determines whether or not there is information about which the terminal, which has transmitted the signal received in step S1002, is to be notified. System control unit 200 refers to an information message table for each terminal included in device information buffer 240. When system control unit 200 determines that there is the information in the information message table (YES in step S1012), system control unit 200 instructs wireless control unit 234 to transmit the information to the target terminal (step S1014). When system control unit 200 determines that there is not the information in the information message table (NO in step S1012), system control unit 200 proceeds to step S1016.

In step S1016, system control unit 200 sets number i indicating the terminal number to 1. Then, system control unit 200 checks the value of the registration timer for terminal i (step S1018).

When system control unit 200 determines that the registration timer expires, namely the timer value becomes zero (YES in step S1020), system control unit 200 indicates "communication unavailable" for terminal i in the communication available/unavailable table (step S1022). When system control unit 200 determines that the registration timer does not expire (NO in step S1020), system control unit 200 increments number i by one (step S1024). Here, system control unit 200 determines which of number i and the number of terminals n registered in main apparatus 1 (n=2 in the present embodiment) is larger/smaller.

When system control unit 200 determines that number i is equal to or smaller than n (NO in step S1026), system control unit 200 returns the process to step S1018. When system control unit 200 determines that number i is larger than n (YES in step S1026), system control unit 200 determines whether or not the process should be ended (step S1028).

When system control unit 200 determines that an ending condition is not satisfied (NO in step S1028), system control unit 200 returns the process to step S1002. When system control unit 200 determines that the ending condition is satisfied (YES in step S1028), the process is ended. Here, as long as an instruction to end the process is not given from the user, the process may be continued. Alternatively, the process may be ended according to the number of times the process is performed.

Following the process shown in FIG. 10, main apparatus 1 can produce the communication available/unavailable table and notify the terminal for which a message is held in the information message table, about information.

Terminals 10A and 10B notify the user about the information received through the above-described process by means of sounds and/or characters. For example, in the case where the terminal is to give a notification about message 4 in FIG. 9A, the terminal gives the notification about the message via audio output unit 630 in the form of sounds like "eight fifty-five p.m., recording is completed." Alternatively, the terminal may give a notification in the form of characters shown on display unit 650.

In the present embodiment, the information about the terminal in home network system 100 is registered in advance in main apparatus 1. A terminal which has transmitted a signal as newly received is registered in the communication available/unavailable table as a terminal to be notified of information, and the "state" cell for the terminal is indicated as "communication unavailable" in the communication available/unavailable determination table when the communication is unavailable for a predetermined period of time. In this case, the registration of the terminal may be deleted from the communication available/unavailable table, and the terminal may then be registered as a terminal to be notified of information in the communication available/unavailable table when the communication becomes available again.

As heretofore described, in the present embodiment, information about a home electrical device included in home network system 100 can be transmitted by main apparatus 1 to a terminal. Here, when main apparatus 1 determines that the terminal is out of the communication-available area, main apparatus 1 writes the information about the home electrical device into device information buffer 240. When main apparatus 1 determines that the terminal enters the communication-available area, main apparatus 1 notifies the terminal of the information written into device information buffer 240. Accordingly, the user carrying the terminal can know the information about the home electrical device located in the home at the time when the user enters the communication-available area of main apparatus 1, such as when the user returns home. Thus, the user's attention is called when the user is notified of the fact for example that the reserved process such as reserved recording is completed, and accordingly the user can be prevented from forgetting the details of the reserved process. Further, it is unnecessary for the user to go and check each of respective states of home electrical devices provided at different locations.

Second Embodiment

In the present embodiment, home network system 100 including main apparatus 1 and a terminal capable of communicating with main apparatus 1 by radio as shown in FIG. 1 will be considered. In the present embodiment, information received from a home electrical device and a terminal to be notified of the information are associated with each other and stored in main apparatus 1 in advance. According to the association, main apparatus 1 notifies the associated terminal about the information received from the home electrical device. Thus, the user of the terminal can know the state of the home electrical device from the information associated with the terminal.

FIG. 11 is a diagram showing an example of an association table for a home electrical device and a terminal. Referring to FIG. 11, the association table for the home electrical device and the terminal will be described. Setting information storage unit 250 of main apparatus 1 associates a home electrical device (including the device number and the device type) with a terminal to be notified of the information about the home electrical device and stores the home electrical device and the terminal associated with each other. The device number is attached in advance to each type of the home electrical device. Here, for example, only terminal 2 is shown to be notified of the information from the HD (Hard Disk) recorder having device number 01. Further, terminals 1, 2, 3, 4 are shown to be notified of the information from the telephone with answering machine having device number 02.

The user can configure the association table using a browser of a PC (not shown) provided on the LAN side of main apparatus 1 in FIG. 1.

While the association table shown in FIG. 1 associates the home electrical device and the terminal with each other, the association table may be configured to associate a specific item of the information with the terminal to be notified of the item. For example, the association table may be configured to define the association such that terminal 1 and terminal 3 are notified of an incoming call from a telephone number specified in advance.

FIG. 12 is a flowchart showing a flow of a process of giving a notification about information according to the association table. Referring to FIG. 12, a process performed by main apparatus 1 in home network system 100 will be described.

In step S1200, system control unit 200 of main apparatus 1 receives via LAN-side communication control unit 230 information from television 12, recording apparatus 14 and IP telephone with answering machine 16. When system control unit 200 determines that information is not received in step S1200 (NO in step S1202), system control unit 200 returns the process to step S1200. When system control unit 200 determines that information is received (YES in step S1202), system control unit 200 sets number i indicating the terminal number to 1 (step S1204).

In step S1206, system control unit 200 determines whether or not a notification about the information to terminal i is necessary. At this time, system control unit 200 refers to the association table held by setting information storage unit 250. When system control unit 200 determines that the notification about the information is not necessary (NO in step S1206), system control unit 200 proceeds to step S1214. When system control unit 200 determines that the notification about the information is necessary (YES in step S1206), system control unit 200 determines whether or not terminal i can make communication (step S1208).

Here, system control unit 200 refers to the communication available/unavailable table held by setting information storage unit 250. When system control unit 200 determines that communication with terminal i can be made (YES in step S1208), system control unit 200 instructs wireless control unit 234 to transmit the information to the terminal (step S1210). When system control unit 200 determines that the communication cannot be made (NO in step S1208), system control unit 200 writes the information about which the notification cannot be notified, into an information message table for terminal i that is held by device information buffer 240 (step S1212).

As the process for terminal i is completed in the above-described manner, system control unit 200 increments number i by one (step S1214). Then, system control unit 200 determines which of number i and the number of terminals n registered in main apparatus 1 (n=2 in the present embodiment) is larger/smaller (step S1216). When system control unit 200 determines that number i is equal to or smaller than the number of terminals n (NO in step S1216), system control unit 200 returns the process to step S1206.

When system control unit 200 determines that number i is larger than the number of terminals (YES in step S1216), system control unit 200 further determines whether or not an ending condition satisfied (step S1218). The ending condition may be defined as done in the process shown in FIG. 7, or another condition may be defined.

When system control unit 200 determines that the ending condition is not satisfied (NO in step S1218), system control unit returns the process to step S1200. When system control unit 200 determines that the ending condition is satisfied (YES in step S1218), the process is ended.

As heretofore described, in the present embodiment, a notification concerning information about a home electrical device included in home network system 100 is given to a terminal that is associated in advance. Accordingly, the user carrying the terminal can know the information about the home electrical device in the home that is associated with the terminal as long as the user is within the communication available area of main apparatus 1. Thus, the user can receive only the information relevant to the user that is defined in advance, and the user's attention is accordingly called.

Third Embodiment

In the present embodiment, home network system 100 including main apparatus 1 and a terminal capable of communicating with main apparatus 1 by radio as shown in FIG. 1 will be considered. A terminal in the present embodiment can transmit, when receiving information from main apparatus 1, a response from a user to main apparatus 1 via wireless LAN interface 236. The user can input the response via key operation unit 640 of the terminal. When main apparatus 1 notifies the terminal about information held by device information buffer 240 while the terminal does not give a response that the terminal has received the information, main apparatus 1 can re-notify the terminal about the information at certain time intervals. In this way, main apparatus 1 can surely notify the user about the device information.

FIGS. 13A and 13B are each a diagram showing an example of a management table used for making a re-notification. FIG. 13A is a diagram showing a table where a home electrical device and information used for making a re-notification are associated with each other. FIG. 133B shows an information message table used for managing the re-notification process.

Referring to FIGS. 13A and 13B, a description will be given of a table where information used for making a re-notification is associated as well as an information message table used for managing the re-notification process (these tables are hereinafter collectively referred to as "management table"). As shown in FIG. 13A, setting information storage unit 250 of main apparatus 1 associates a home electrical device (including the device number and the device type) with information used for making a re-notification about information concerning the home electrical device. The information used for making a re-notification refers to the number of times a notification is made, and the time intervals at which the notification is made. In FIG. 13A, for example, it is shown that a notification is given five times for the information from the telephone with answering machine having device number 02. The time interval at which the notification is made is three minutes. Here, the information concerning the device for which the number of times a notification is to be given is once means that a re-notification is not made. For example, regarding home electrical device 3 with device number 03, the number of times a notification is made is once and a re-notification is not made. In this case, the cell for the notification time interval is blank (shaded).

In FIG. 13B, the information message table and the information used for managing the re-notification process are associated with each other. For each message, the information used for managing the re-notification process such as the remaining number of times a notification is to be made as well as the value of a notification timer counter used for knowing the time at which a notification is to be made are written. When information about which a notification cannot be made is written in the information message table, the management table shown in FIG. 13A is referred to. Here, according to the remaining number of times a notification is to be made and the notification time intervals, the value of the notification timer counter is also written. In FIG. 13B, column 130 shows the remaining number of times a notification is to be made, and column 132 shows the value of the notification timer counter. For example, the remaining number of times a notification is to be made for the message shown by counter 2 is two, and the value of the notification timer counter for the message is 89. System control unit 200 includes a timer therein (not shown in FIG. 2). Based on the timer, the notification timer counter is automatically decremented.

Further, the user can set the number of times a notification is made and the notification time intervals to appropriate values by means of a browser of a PC (not shown) provided on the LAN side of main apparatus 1 in FIG. 1.

Figure 14:
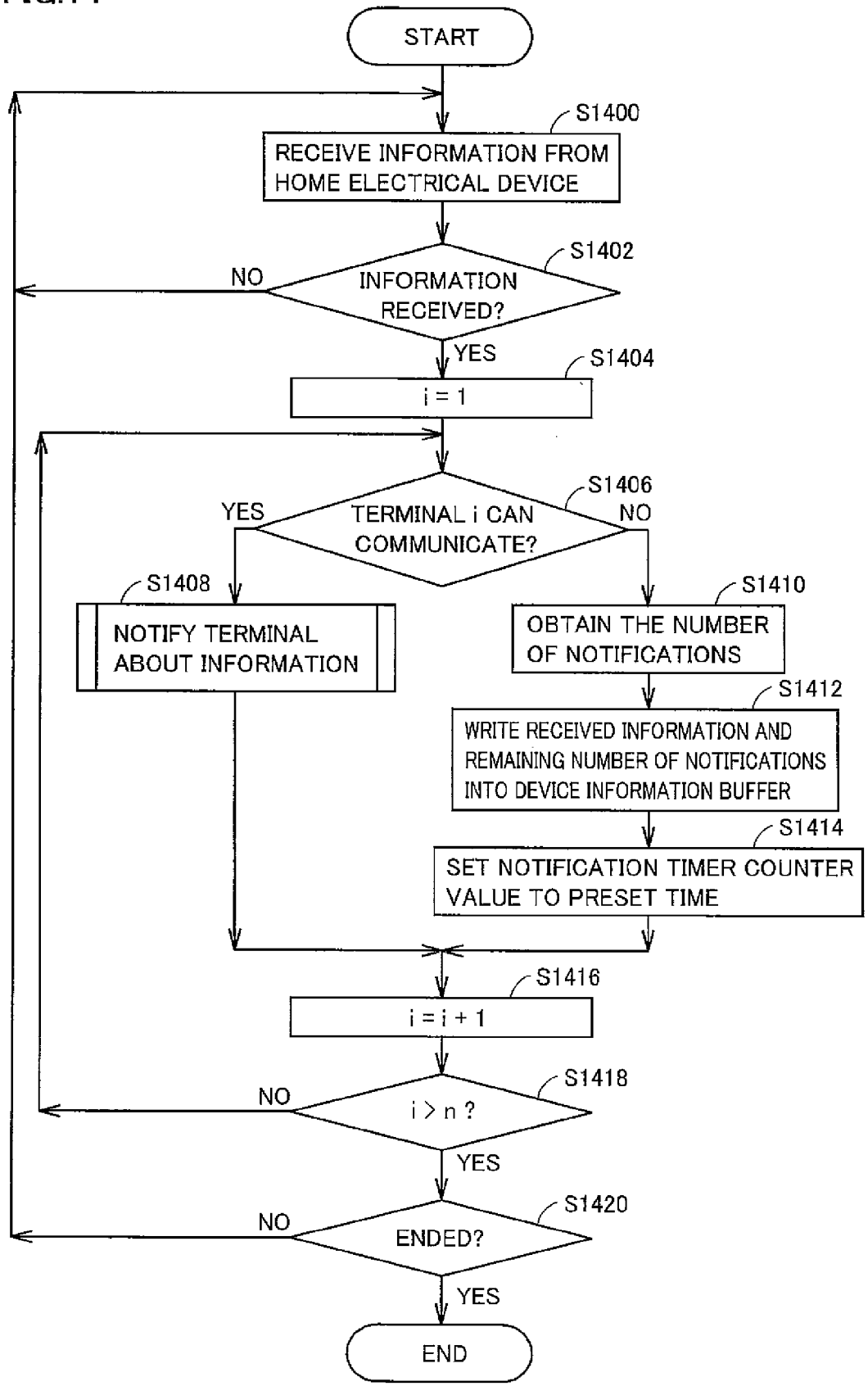
FIG. 14 is a flowchart showing a flow of a process of transmitting, to a terminal, information received from a home electrical device or writing the information into a device information buffer in a third embodiment.
Figure 15:
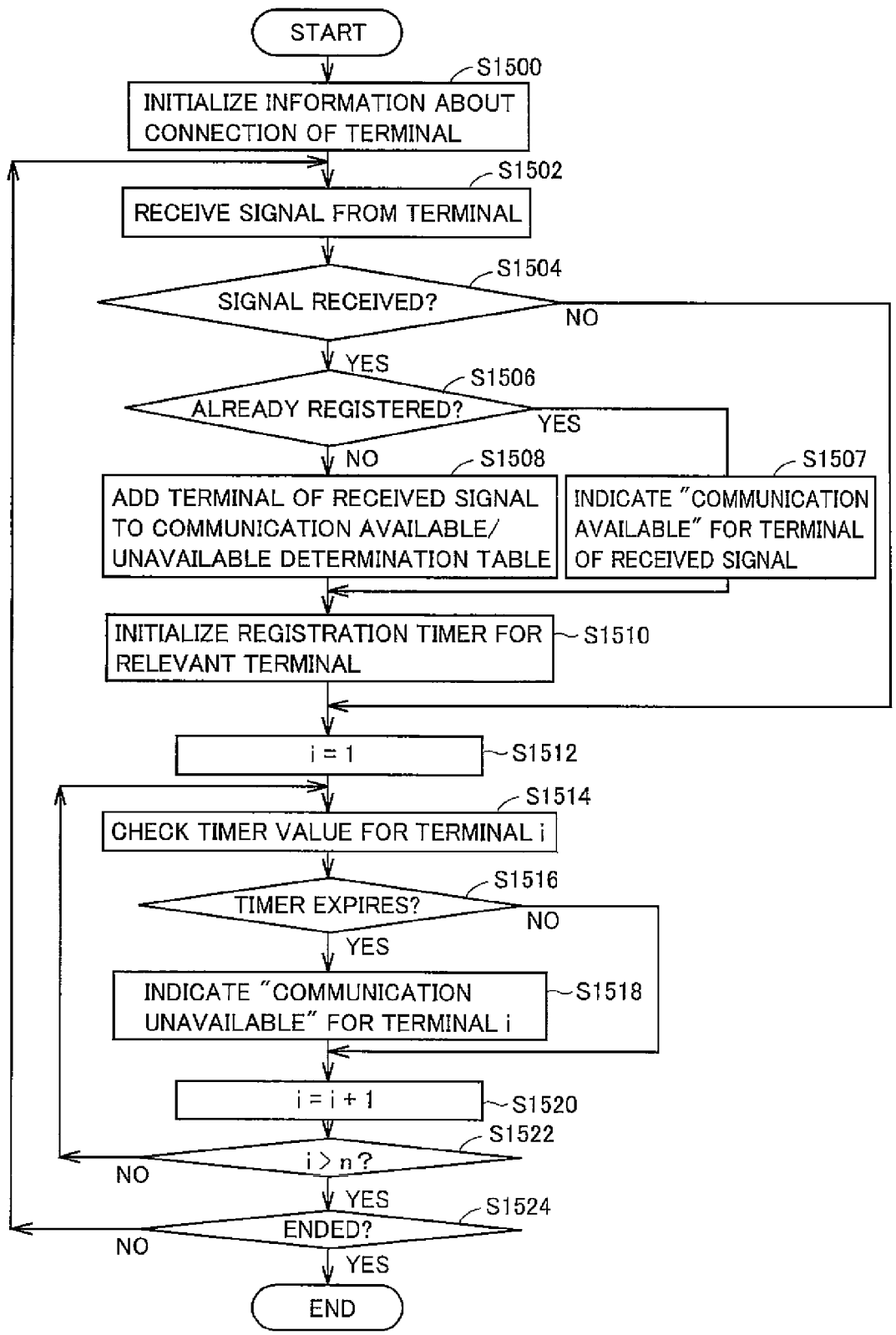
FIG. 15 is a flowchart showing a flow of a process of producing a communication available/unavailable determination table by main apparatus 1.
Figure 16:
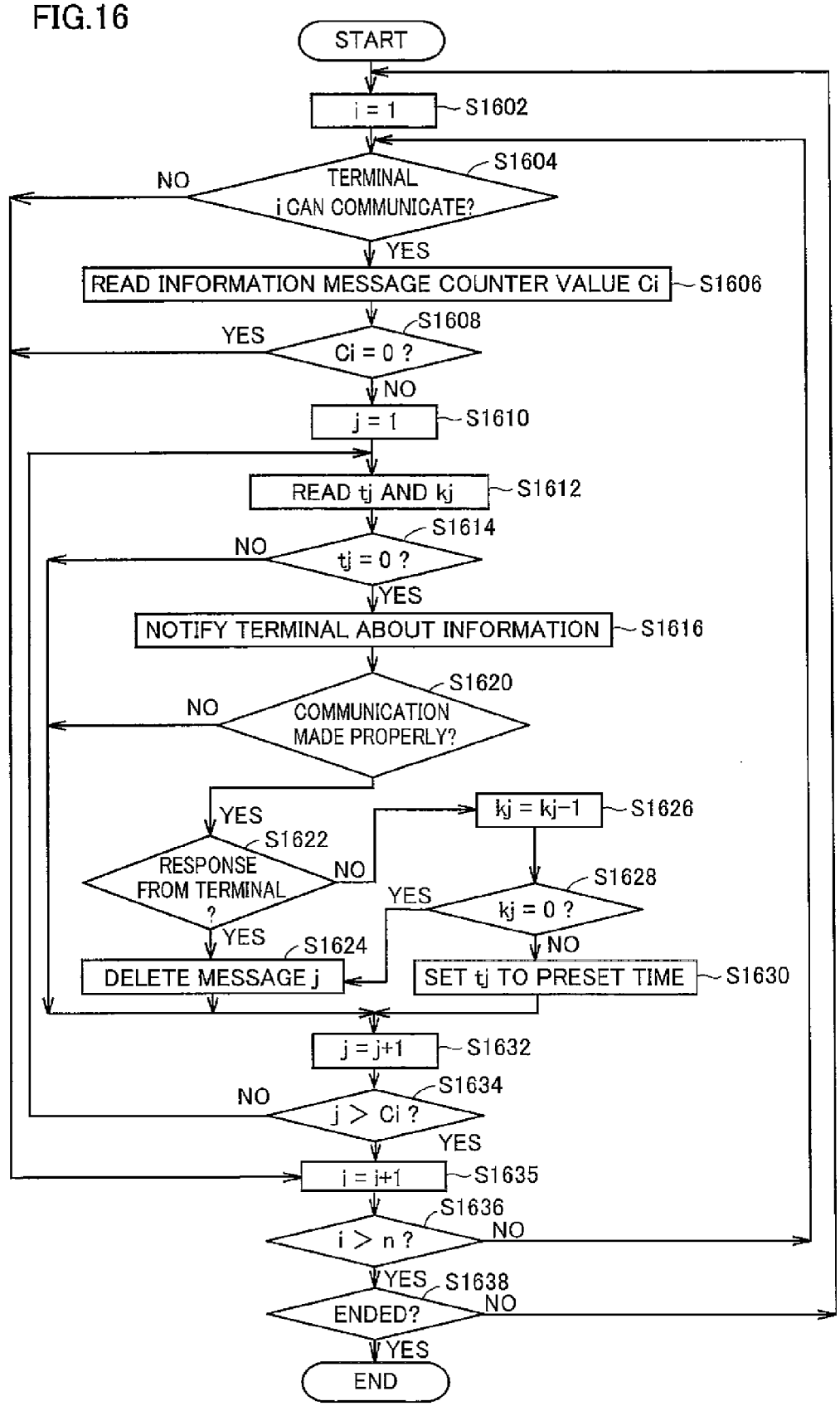
FIG. 16 is a flowchart showing a flow of a process of making a re-notification about information at certain intervals.

FIG. 14 is a flowchart showing a flow of a process of transmitting to a terminal information received from a home electrical device or writing the information into the device information buffer in the third embodiment. FIG. 15 is a flowchart showing a flow of a process of producing a communication available/unavailable determination table by main apparatus 1. FIG. 16 is a flowchart showing a flow of a process of making a re-notification at certain time intervals.

Referring to FIGS. 14, 15 and 16, an operation performed when main apparatus 1 makes a re-notification about information will be described. Main apparatus 1 performs respective processes shown in FIGS. 14, 15 and 16 in parallel. Following the processes, main apparatus 1 having given a notification about device information held by the information buffer to a terminal can make a re-notification at certain time intervals if the terminal does not give a response that the terminal has received the information.

The process shown in FIG. 14 is similar to the process in FIG. 7 except that step S710 in FIG. 7 is replaced with steps S1410 to S1414 in FIG. 14. Therefore, the description of the process steps similar to those in FIG. 7 will not be repeated. Here, the process from step S1410 to step S1414 will be described.

When system control unit 200 determines that communication with terminal i cannot be made (NO in step S1406), system control unit 200 refers to the management table to obtain the number of times a notification is to be made as described above (step S1410).

In step S1412, system control unit 200 writes the received information and the remaining number of times k a notification is to be made, into device information buffer 240 as shown in FIG. 13B.

Then, in step S1414, system control unit 200 makes initial settings by setting notification timer counter value t to the time defined as the notification time interval. For the home electrical device for which the number of notifications is one, the counter value is set to zero.

In this way, main apparatus 1 performs the process of transmitting information received from a home electrical device to a terminal or writing the information into the device information buffer.

The process shown in FIG. 15 is similar to the process in FIG. 10 except that steps S1012 to S1014 (process of giving a notification about information written into the device information buffer) in FIG. 10 are not included in FIG. 15. Therefore, the same description will not be repeated here. Following this process, main apparatus 1 performs the process of producing a communication available/unavailable determination table.

In the following, the process shown in FIG. 16 will be described. Following this process, main apparatus 1 makes a re-notification about information according to a management table.

In step S1602, system control unit 200 sets number i indicating the terminal number to 1.

In step S1604, system control unit 200 determines, from the communication available/unavailable determination table, whether or not communication with terminal i can be made.

When system control unit 200 determines that communication with terminal i can be made (YES in step S1604), system control unit 200 reads information message counter value $C_i$ of terminal i that is held by device information buffer 240 (step S1606). Here, the information message counter value refers to the number of messages included in the information message table. For example, regarding the information message table shown in FIG. 13B, the message counter value is 5.

In contrast, when system control unit 200 determines that communication with terminal i cannot be made (NO in step S1604), system control unit 200 proceeds to the process in step S1635.

Then, in step S1608, system control unit 200 determines whether or not information message counter value $C_i$ is zero. Here, if information message counter value $C_i$ is zero, it is meant that the information message table includes no information about which a notification is to be made. When system control unit 200 determines that information message counter value $C_i$ is not zero (NO in step S1608), system control unit 200 sets counter value j of the information message table to 1 (step S1610).

In contrast, when system control unit 200 determines that information message counter value $C_i$ is zero (YES in step S1608), system control unit 200 proceeds to the process in step S1635.

In step S1612, system control unit 200 reads notification timer counter value $t_j$ and remaining number of notifications $k_j$ of the information shown by counter j of the information message table (hereinafter referred to as message j).

Further, in step S1614, system control unit 200 determines whether or not notification timer counter value $t_j$ is zero. When system control unit 200 determines that notification timer counter value $t_j$ is zero (YES in step S1614), system control unit 200 notifies terminal i about message j (step S1616).

In contrast, when system control unit 200 determines that notification timer counter value $t_j$ is not zero (NO in step S1614), system control unit 200 proceeds to the process in step S1632.

Then, in step S1620, system control unit 200 determines whether or not notification of the information has been made properly in step S1616. When system control unit 200 determines that the notification has not been made properly (NO in step S1620), system control unit 200 proceeds to the process in step S1632.

In contrast, when system control unit 200 determines that the notification has been made properly (YES in step S1620), system control unit 200 determines whether or not there is a response from the terminal (step S1622). The user of the terminal can give a response, upon confirming information, showing that the user has confirmed the information, to main apparatus 1 via key operation unit 640 of the terminal.

When system control unit 200 determines that there is a response from the terminal (YES in step S1622), system control unit 200 deletes message j from the information message table since re-notification of the information is unnecessary (step S1624).

In contrast, when system control unit 200 determines that there is no response from the terminal (NO in step S1622), system control unit 200 updates remaining number of notifications $k_j$ by decrementing the number by one (step S1626).

In step 81628, system control unit 200 determines whether or not remaining number of notifications $k_j$ is zero. When system control unit 200 determines that remaining number of notifications $k_j$ is zero (YES in step S1628), system control unit 200 deletes message j from the information message table as descried above (step S1624).

In contrast, when system control unit 200 determines that remaining number of notifications $k_j$ is not zero (NO in step S1628), system control unit 200 re-sets notification timer counter value $t_j$ to the value defined as notification interval (step S1630).

Through the steps above, the notification process for message j is completed. In step S1632, system control unit 200 updates counter value j by adding one to the counter value.

Then in step S1634, system control unit 200 determines whether or not the value of j is larger than the value of $C_i$. When system control unit 200 determines that the value of j is equal to or smaller than the value of $C_i$ (NO in step S1634), system control unit 200 returns the process to step S1612, because there remains information about which a notification should be given to the device information buffer and accordingly the above-described notification process is to be performed.

In contrast, when system control unit 200 determines that the value of j is larger than the value of $C_i$ (YES in step S1634), system control unit 200 updates number i of the terminal by adding one to number i. (step S1635).

Further, in step S1636, system control unit 200 determines whether or not number i of the terminal is larger than the number of terminals n registered as terminals to be notified of information. When system control unit 200 determines that number i is equal to or smaller than n (NO in step S1636), system control unit 200 returns the process to step S1604, for performing the notification process for terminal i.

In contrast, when system control unit 200 determines that number i is larger than n (YES in step S1636), system control unit 200 determines whether or not an ending condition is satisfied (step S1638). The ending condition may be defined as done in the process shown in FIG. 7, or another condition may be defined.

When system control unit 200 determines that the ending condition is not satisfied (NO in step S1638), system control unit 200 returns the process to step S1602. When system control unit 200 determines that the ending condition is satisfied (YES in step S1638), the process is ended.

Here, even when the information message table is the one as shown in FIG. 9B, each item may be associated with information used for making a re-notification and accordingly stored based on the management table.

As heretofore described, in the present embodiment, when main apparatus 1 notifies the terminal about the device information held by the information buffer, main apparatus 1 can make a re-notification at certain intervals if the terminal does not send a response that the terminal has received the information. In this way, main apparatus 1 can surely inform the user about the device information. Thus the user's attention is called and the user can be prevented from forgetting to watch a reserved recording for example.

Fourth Embodiment

In the present embodiment, home network system 100 including main apparatus 1 and a terminal capable of communicating with main apparatus 1 by radio as shown in FIG. 1 will be considered. Main apparatus 1 in the present embodiment can perform a process of newly adding information received from a home electrical device to the device information buffer that has already held information. Further, main apparatus 1 can perform a process of replacing already-written information with newly-received information. A user can select to add information or replace information depending on the type of the home electrical device, by means of a browser for example of a PC. Thus, main apparatus 1 can replace (old) information that is not necessary for the user to receive with new information. Therefore, the user can always know the latest device information. Here, an example of the information to be replaced is the number of incoming calls of a telephone.

FIG. 17 is a diagram showing an example of an information addition/replacement setting table. Referring to FIG. 17, an addition/replacement process will be described. Setting information storage unit 250 of main apparatus 1 associates a home electrical device with the addition of information from the home electrical device to the device information buffer, or the replacement of information in the device information buffer with information from the home electrical device like the table shown in FIG. 17, and stores the association. Value "1" indicates the addition to the device information buffer. Value "2" indicates the replacement of information held by the device information buffer with newly received information. For example, information from the HD recorder with device number 01 is added to the device information buffer.

FIG. 18 is a diagram showing an example of a setting operation screen for the information addition/replacement process. Referring to FIG. 18, a description will be given of a user's setting operation for addition/replacement of information. The user can select the information addition/replacement setting by means of the table as shown in FIG. 18. This operation can be performed on a browser for example of a PC connected to main apparatus 1. For example, the user selects the addition button or replacement button using an input interface such as mouse. Then, the user presses the setting button to confirm the setting.

Thus, with these settings, an "addition" process, a "replacement" process or a combination of them can be performed on all information items for notification.

Figure 19:
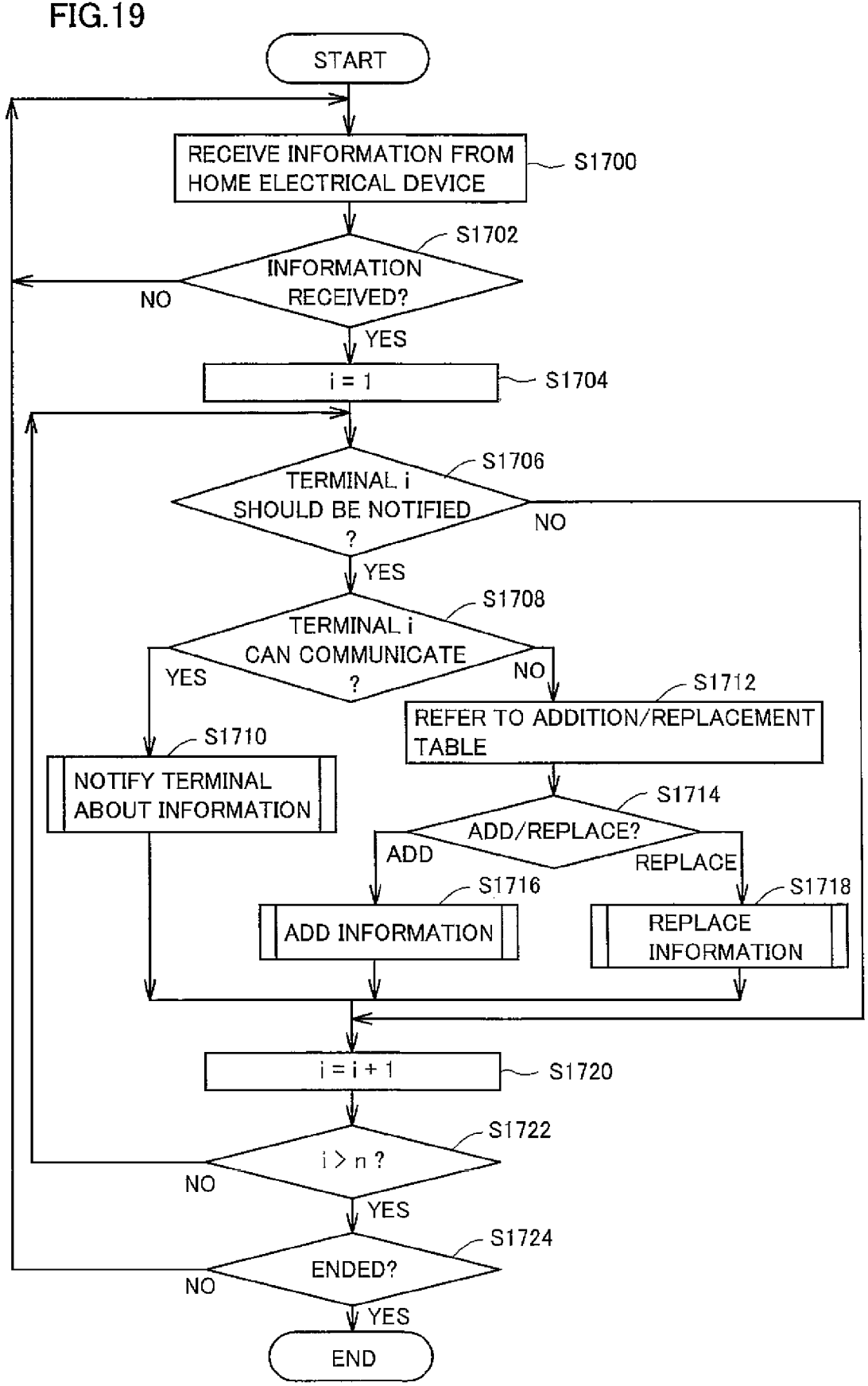
FIG. 19 is a flowchart showing a process performed by main apparatus 1 in receiving information from a home electrical device and transmitting the information to a terminal, involving a process of adding/replacing information.

FIG. 19 is a flowchart showing a process performed by main apparatus 1 receiving information from a home electrical device and transmitting the information to a terminal, involving the process of adding/replacing information.

Referring to FIG. 19, a description will be given of an operation of main apparatus 1 involving the process of adding/replacing information. Following the process shown in FIG. 19, the process of adding/replacing information about a home electrical device can be performed and a terminal associated in advance can be notified of the information.

The process shown in FIG. 19 is similar to the process in FIG. 12 except that step S1212 in FIG. 12 is replaced with step S1712 to step S1718. The process in FIG. 12 has been described above in connection with the second embodiment, and the description will not be repeated here.

In step S1712, system control unit 200 refers to an addition/replacement setting table held by setting information storage unit 250. When system control unit 200 determines that the setting for the information received from the home electrical device in step S1700 is the addition setting (ADDITION in step S1714), system control unit 200 performs the process of adding the information (step S1716). When system control unit 200 determines that the setting for the information received in step S1700 is the replacement setting (REPLACEMENT in step S1714), system control unit 200 performs the process of replacing information (step S1718).

In the following, the process in step S1716 and step S1718 will be specifically described.

Figure 20:
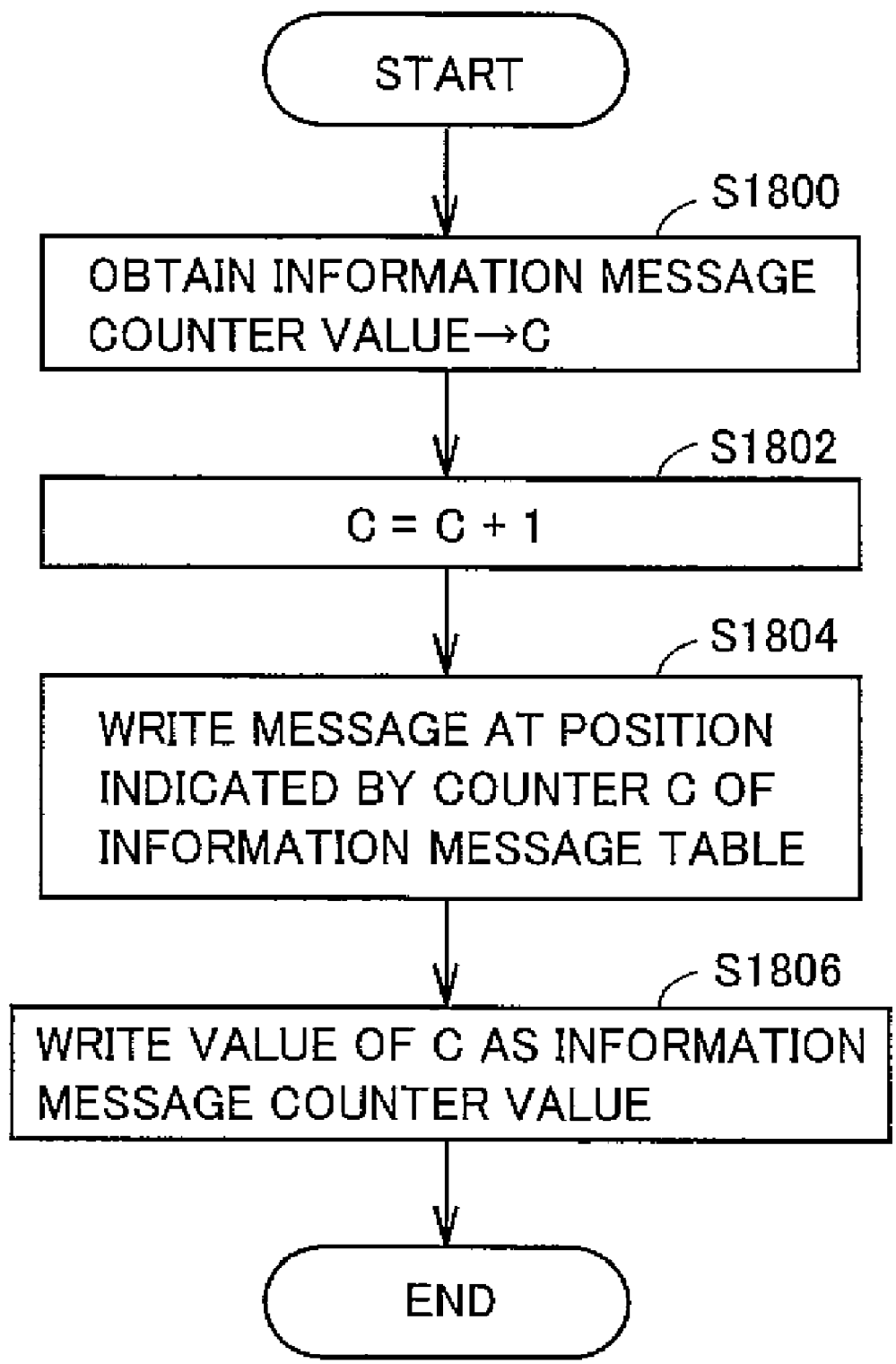
FIG. 20 is a flowchart showing a flow of a process of adding information.

FIG. 20 is a flowchart showing a flow of the process of adding information. Referring to FIG. 20, a description will be given of a process performed on the information message table when main apparatus 1 adds information in step S1716.

In step S1800, system control unit 200 obtains an information message counter value and sets the value to C. Then, in step S1802, system control unit 200 increments counter value C by one.

System control unit 200 writes the information received in step S11700 at the position indicated by counter C of the information message table (step S1804). Then, system control unit 200 writes the value of C as the information message counter value (step S1806), and the process is ended.

In this way, information can be added to the information message table.

Figure 21:
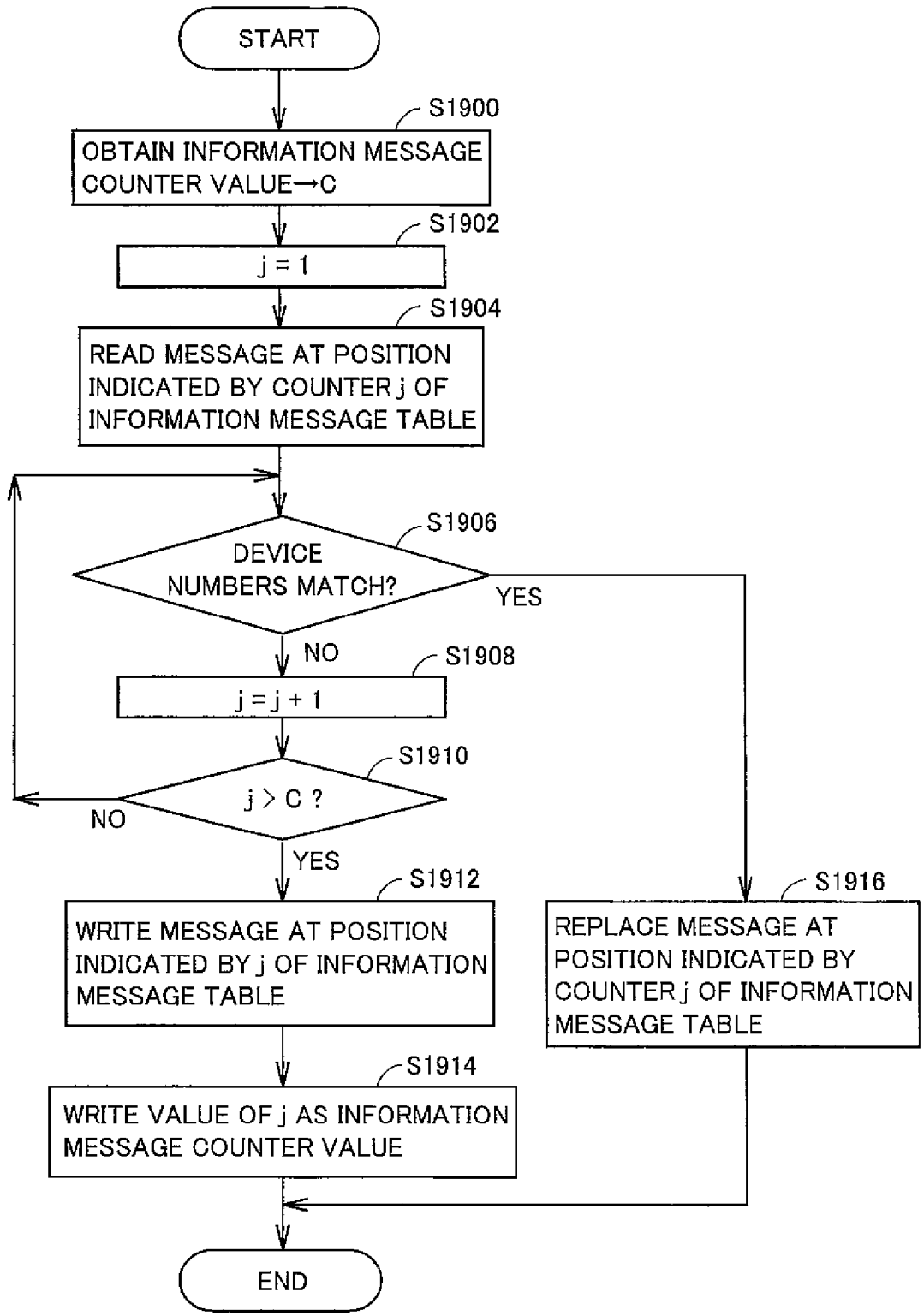
FIG. 21 is a flowchart showing a flow of a process of replacing information.

FIG. 21 is a flowchart showing the process of replacing information. Referring to FIG. 21, a description will be given of a process performed on the information message table when main apparatus 1 replaces information in step S1718.

In step S1900, system control unit 200 obtains an information message counter value and sets the value to C. Then, in step S1902, system control unit 200 sets counter j to 1.

In step S1904, system control unit 200 reads the device number of the home electrical device indicated by counter j of the information message table. System control unit 200 determines whether or not the device number included in the information received by wireless control unit 234 in step S1700 matches the device number indicated by counter j (step S1906). When system control unit 200 determines that the device numbers match each other (YES in step S1906), system control unit 200 replaces the information at the position indicated by counter j of the information message table and the information received in step S1700 with each other (step S1916). When system control unit 200 determines that respective device numbers do not match each other (NO in step S1906), system control unit 200 increments counter j by one (step S1908).

In step S1910, system control unit 200 determines whether or not counter j is larger than C. When system control unit 200 determines that counter j is equal to or smaller than C (NO in step S1910), system control unit 200 returns the process to step S1906. When system control unit 200 determines that counter j is larger than C (YES in step S1910), system control unit 200 writes the information received in step S1700 at the position indicated by counter j of the information message table (step S1912). Namely, since there is no information to be replaced in the information message table, the process of adding the information is performed. Then, system control unit 200 writes the value of counter j as the information message counter value (step S1914), and the process is ended.

In this way, information included in the information message table and received information can be replaced with each other.

As heretofore described, main apparatus 1 in the present embodiment can perform the process of newly adding information received from a home electrical device to the device information buffer having already held information. Further, main apparatus 1 can perform the process of replacing already-written information with newly-received information. Further, the user can select to add the information or replace the information, depending on the type of the home electrical device, by means of a browser for example of a PC. Accordingly, main apparatus 1 can replace the information which is unnecessary for the user to receive with new information. The user can thus know the latest device information all the time.

Fifth Embodiment

In the present embodiment, home network system 100 including main apparatus 1 and a terminal capable of communicating with main apparatus 1 by radio as shown in FIG. 1 will be considered. Control unit 600 of terminal 10A in the present embodiment can instruct wireless control unit 670 to make a request, to main apparatus 1, to transmit information. Thus, the terminal can obtain information without waiting for transmission of the information from main apparatus 1.

Figure 22:
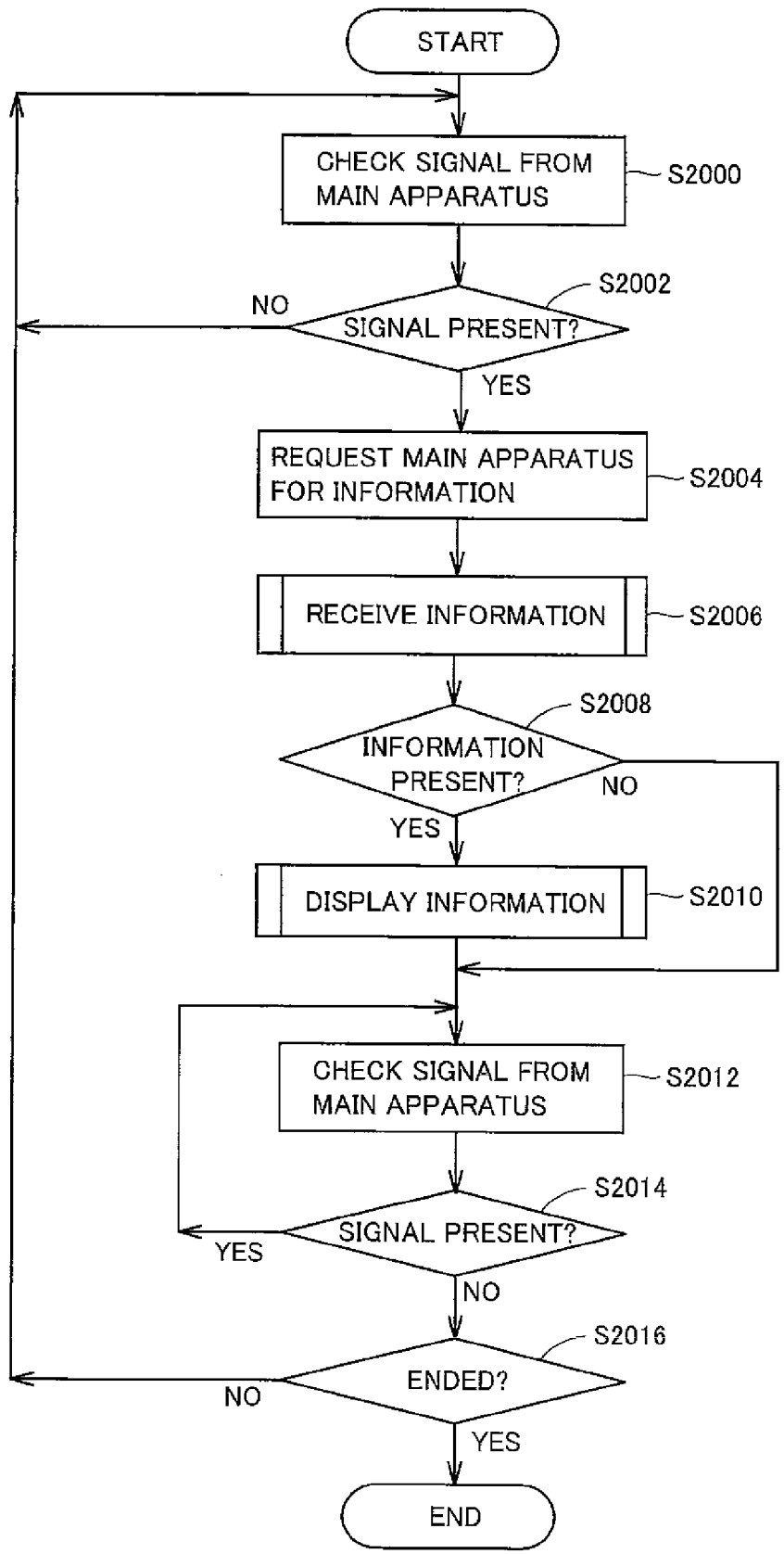
FIG. 22 is a flowchart showing a flow of a process of requesting information from a terminal.

FIG. 22 is a flowchart showing a flow of a process of making a request for information from a terminal. Referring to FIG. 22, an operation performed by terminal 10A will be described.

In step S2000, control unit 600 instructs wireless control unit 670 to check a beacon signal for example generated by main apparatus 1. When control unit 600 determines that the signal is not received (NO in step S2002), control unit 600 returns the process to step S2000.

When control unit 600 determines that the signal is received (YES in step S2002), control unit 600 instructs wireless control unit 670 to transmit, to main apparatus 1, a signal requesting device information (step S2004). Then, wireless control unit 670 performs a process for receiving information from main apparatus 1 (step S2006). At this time, control unit 600 determines whether or not information is received (step S2008). When control unit 600 determines that information is received (YES in step S2008), control unit 600 performs a process for displaying the information on display unit 650 (step S2010). Alternatively, the user may be notified of the information by sound via audio output unit 630. When control unit 600 determines that information is not received (NO in step S2010), control unit 600 proceeds to the process in step S2012.

In step S2012, control unit 600 instructs wireless control unit 670 to check a signal generated by main apparatus 1. When control unit 600 determines that the signal is received (YES in step S2014), control unit 600 returns the process to step S2012. When control unit 600 determines that the signal is not received (NO in step S2014), control unit 600 determines whether or not an ending condition is satisfied (step S2016). When control unit 600 determines that the ending condition is not satisfied in step S2016), control unit 600 returns the process to step S2000. When control unit 600 determines that the ending condition is satisfied (YES in step S2016), the process is ended. Here, as long as an instruction to end is not given from a user, the process may be continued. Alternatively, the process may be ended depending on the number of times the process is performed.

As heretofore described, the terminal in the present embodiment can make a request to transmit information to main apparatus 1. Thus, without waiting for transmission of information from main apparatus 1, the terminal can obtain the information. Therefore, even when the terminal cannot receive information transmitted from main apparatus 1 because the terminal is performing a telephone call process for example at that time, the user can surely know the device information. Here, the case where information transmitted from main apparatus 1 cannot be received is not limited to the case where a telephone call process is performed. The case may be the one where control unit 600 performs a process for an application in the terminal for example.

It should be construed that embodiments disclosed above are by way of illustration in all respects, not by way of limitation. It is intended that the scope of the present invention is defined by claims, and includes all modifications and variations equivalent in meaning and scope to the claims.

The invention claimed is :

1. An information notification apparatus comprising:
 a communication unit for communicating with a stationary electronic device and communicating by radio with a portable communication terminal;
 a storage unit for storing notification information from said electronic device, said notification information being defined in advance as information of which the portable communication terminal is to be notified; and
 a control unit for controlling said communication unit and said storage unit,
 said control unit including:
  a determination unit for determining that said portable communication terminal is in a state where said portable communication terminal can communicate by radio;
  a writing unit for receiving the notification information from said electronic device, and writing into said storage unit said received notification information, in response to a determination by said determination unit that said portable communication terminal is not in said state where said portable communication terminal can communicate by radio; and
  a communication control unit for controlling said communication unit such that said portable communication terminal is notified of the notification information from said electronic device, in response to a determination by said determination unit that said portable communication terminal is in said state where said portable communication terminal can communicate by radio.

2. The information notification apparatus according to claim 1, wherein
 said storage unit stores a first association between said electronic device and identification information of a portable communication terminal to be notified of the notification information from said electronic device, and
 said communication control unit controls said communication unit such that the portable communication terminal associated by said first association is notified of the notification information from said electronic device.

3. The information notification apparatus according to claim 1, wherein
 when said communication unit does not receive a response to said notification information from said portable communication terminal, said communication control unit controls said communication unit such that said notification information is repeatedly transmitted to said portable communication terminal having failed to make said response.

4. The information notification apparatus according to claim 1, wherein
in a case where said storage unit holds notification information from said electronic device and when said communication unit receives notification information from said electronic device, said writing unit writes said received notification information in addition to said held notification information.

5. The information notification apparatus according to claim 1, wherein
in a case where said storage unit holds notification information from said electronic device and when said communication unit receives notification information from said electronic device, said writing unit writes said received notification information in replacement of a part of said held notification information.

6. The information notification apparatus according to claim 1, wherein
said storage unit stores a second association between said electronic device and writing of notification information from said electronic device into said storage unit by addition or writing of notification information from said electronic device into said storage unit by replacement, and
said writing unit writes the notification information from said electronic device into said storage unit based on said second association.

7. The information notification apparatus according to claim 1, wherein said notification information being defined in advance as information of which the portable communication device is to be notified.

8. The information notification apparatus according to claim 1, further comprising a storing unit storing a communication available/unavailable table, wherein the control unit determines whether or not the information notification apparatus is in a state where it can communicate with the portable communication terminal according to state information stored in the communication available/unavailable table.

9. The information notification apparatus according to claim 8, wherein when the control unit determines that a signal from the terminal indicating the terminal's presence is received, the control unit determines whether or not the terminal is registered as a terminal to be notified of information, based on the communication available/unavailable table.

10. The information notification apparatus according to claim 9, wherein when the control unit determines that the terminal transmitting the signal is not registered as a terminal to be notified of information, the control unit stores the state of communication of the terminal in the communication available/unavailable table as communication available.

11. The information notification apparatus according to claim 9, wherein when the control unit determines that the terminal transmitting the signal is registered as a terminal to be notified of information, the control unit indicates the state of communication of the terminal in the communication available/unavailable tables as communication available.

12. A portable communication terminal for receiving notification information transmitted from an information notification apparatus, comprising:
a communication unit for communicating with said information notification apparatus by radio; and
a control unit for controlling said communication unit,
said control unit including:
a determination unit for determining that said information notification apparatus is in a state where said information notification apparatus can communicate by radio; and
a communication control unit for controlling said communication unit such that a signal is transmitted to said information notification apparatus for requesting notification information held by said information notification apparatus, in response to a determination by said determination unit that said information notification apparatus is in said state where said information notification apparatus can communicate by radio.

13. The portable communication terminal according to claim 12, wherein said determination unit is configured to determine whether or not the portable communication terminal receives a signal from the information notification apparatus, and
said control unit is configured to end the process performed by the information notification apparatus when the portable communication terminal does not receive a signal from the information notification apparatus.

14. The portable communication terminal according to claim 13, wherein said control unit is configured to:
determine whether a condition for ending the process by the portable communication terminal is satisfied; and
check further reception of a signal from the information notification apparatus.

15. The portable communication terminal according to claim 12, wherein said notification information being defined in advance as information of which the portable communication device is to be notified.

16. The portable communication terminal according to claim 12, wherein the control unit determines whether or not the information notification apparatus is in a state where it can communicate with the portable communication terminal according to state information stored in a communication available/unavailable table.

* * * * *